United States Patent
Mitsunaga

(10) Patent No.: US 7,791,652 B2
(45) Date of Patent: Sep. 7, 2010

(54) IMAGE PROCESSING APPARATUS, IMAGE CAPTURE APPARATUS, IMAGE OUTPUT APPARATUS, AND METHOD AND PROGRAM FOR THESE APPARATUS

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 11/808,499

(22) Filed: Jun. 11, 2007

(65) Prior Publication Data
US 2008/0043120 A1 Feb. 21, 2008

(30) Foreign Application Priority Data
Jun. 12, 2006 (JP) .............................. 2006-162927

(51) Int. Cl.
H04N 5/262 (2006.01)
H04N 9/68 (2006.01)
H04N 5/208 (2006.01)
H04N 5/235 (2006.01)
H04N 5/238 (2006.01)
G06K 9/00 (2006.01)
G06K 15/00 (2006.01)

(52) U.S. Cl. ...................... 348/239; 348/238; 348/252; 348/222.1; 348/365; 382/167; 538/2.1

(58) Field of Classification Search ............... 348/238, 348/234–239, 252, 222.1, 353, 365, 251, 348/625, 673, 687, 254, E5.064; 382/167, 382/162, 199, 266, 269, 274; 359/2.1, 3.15, 359/3.27, 520, 521
See application file for complete search history.

(56) References Cited

U.S. PATENT DOCUMENTS 5,805,216 A * 9/1998 Tabei et al. .................. 348/246

(Continued)

FOREIGN PATENT DOCUMENTS

JP 08-168004 6/1996

(Continued)

OTHER PUBLICATIONS

Notification of Reasons for Refusal for related Japanese Patent Application No. 2006-162927 drafted on Jun. 30, 2008 (3 pages).

(Continued)

Primary Examiner—Tuan Ho
Assistant Examiner—Marly Camargo
(74) Attorney, Agent, or Firm—Finnegan, Henderson, Farabow, Garrett, & Dunner, L.L.P.

(57) ABSTRACT

An image processing apparatus includes: a contrast area detector detecting a partial area from among partial areas in an input image signal as a contrast area, the input image signal being formed by a plurality of pixels, the contrast area being a partial area in which contrast of an input luminance indicative of a luminance of the input image signal is greater than a predetermined value; a luminance distributor distributing the input luminance in the contrast area into a bright-side luminance corresponding to a bright side of the input luminance and a dark-side luminance corresponding to a dark side of the input luminance; and a boundary luminance value generator generating a boundary luminance value between the bright-side luminance and the dark-side luminance on the basis of the distributions of the bright-side luminance and the dark-side luminance.

12 Claims, 20 Drawing Sheets

U.S. PATENT DOCUMENTS

| | | | | |
|---|---|---|---|---|
| 6,151,410 | A * | 11/2000 | Kuwata et al. | 382/167 |
| 6,266,102 | B1 * | 7/2001 | Azuma et al. | 348/671 |
| 6,806,903 | B1 * | 10/2004 | Okisu et al. | 348/254 |
| 7,010,160 | B1 * | 3/2006 | Yoshida | 382/162 |
| 7,271,838 | B2 * | 9/2007 | Suekane et al. | 348/333.02 |
| 7,342,609 | B2 * | 3/2008 | Takizawa | 348/362 |
| 7,386,185 | B2 * | 6/2008 | Watanabe et al. | 382/274 |
| 7,551,794 | B2 * | 6/2009 | Masuno et al. | 382/264 |
| 2005/0024508 | A1 * | 2/2005 | Okisu et al. | 348/254 |
| 2007/0273686 | A1 * | 11/2007 | Watanabe et al. | 345/419 |

FOREIGN PATENT DOCUMENTS

| | | |
|---|---|---|
| JP | 2000-004393 | 1/2000 |
| JP | 2002-006474 | 1/2002 |
| JP | 2004-259177 | 9/2004 |

OTHER PUBLICATIONS

Nobuyuki Otsu, Automatic threshold value selection method based on distinction and the smallest square collimation, The Institute of Electronics and Communication Engineers article magazine, Japan, Corporate judicial person The Institute of Electronics and Communications Engineers, Apr. 25, 1980, vol. J63-D, No. 4, pp. 349-356.

* cited by examiner

↓ NONLINEAR TRANSFORMATION

↓ BLOCK MEAN

IMAGE PROCESSING APPARATUS, IMAGE CAPTURE APPARATUS, IMAGE OUTPUT APPARATUS, AND METHOD AND PROGRAM FOR THESE APPARATUS

BACKGROUND OF THE INVENTION

1. Field of the Invention

The present invention relates to an image processing apparatus and, more particularly, to an image processing apparatus, an image capture apparatus and an input output apparatus all of which are constructed to perform brightness correction on images, as well as a processing method for these apparatuses and a program which causes a computer to execute the processing method.

2. Description of Related Art

Typically, in image capture apparatuses and image output apparatuses, processing for evaluating brightness of an original image through measurement and calculating a brightness correction amount on the basis of the resultant evaluation value have been performed in order to capture or output an image with appropriate brightness.

For example, many types of image capture apparatuses are provided with mechanisms for automatically controlling operations of their optical systems or their image sensors. Particularly, mechanisms for controlling the amount of exposure and adjusting the brightness of capture images are typically called Automatic Exposure (AE). An image capture apparatus having an AE mechanism includes a system for photometering the brightness of capture image data and performing exposure control on the basis of the measured brightness, in addition to a system for generating and outputting color image data with appropriate color and gradation by demosaicing, gamma correction, color correction and the like. In other words, in the image capture apparatus, a photometry evaluation value which evaluates the brightness of capture image data on the basis of a measured value of the brightness of each section of the capture image data is outputted and compared with a reference value indicative of standard brightness. Then, the amount of deviation between the photometry evaluation value and the reference value is calculated as a difference value, and the amount of aperture of a stop in the optical system, the charge storage time of a sensor, the amount of amplification of an amplifier and the like are adjusted in such a way that the difference values approaches 0, whereby the amount of exposure is controlled.

As such an AE mechanism, it has been proposed to provide a device which generates an integrated value of a luminance value of each of small areas into which the capture image data is divided, and performs weighted addition of the integrated luminance value to find the brightness evaluation value of the entire image. For example, an image processing apparatus has been proposed which divides the pixels of the entire picture of image data into a plurality of areas and finds a photometry value by using the central section of the image as the main area (refer to, for example, Japanese Patent Application Publication Number 2004-259177 (FIG. 1)).

SUMMARY OF THE INVENTION

The above-mentioned prior art finds the photometry value by assuming the central section of the image as the main area. However, since there are a wide variety of subjects such as persons and landscapes, a main subject is not necessarily positioned in the center of the screen.

Furthermore, if the size of a photometry frame is fixed, there is also a possibility that a subject other than the main subject enters the photometry frame because of the size of the subject. However, it is actually difficult to change the size and shape of the photometry frame depending on individual subjects.

First of all, in order to perform brightness correction by using the amount of reflected light as an indicator, strictly speaking, it is necessary to control the brightness of a subject in accordance with the reflectance of the subject. In other words, a subject of low reflectance needs to be reproduced as a bright subject, while a subject of high reflectance needs to be reproduced as a dark subject. However, if the reflectance of a subject is to be found from an input image under arbitrary illumination, object recognition processing is needed as a prerequisite. Accordingly, this method is not practical in terms of processing speeds.

Accordingly, it is desirable to evaluate the brightness of an input image by taking note of an area having a local difference in the brightness between light and dark (contrast) in the input image. Furthermore, it is desirable to perform exposure control of an image capture apparatus and/or brightness correction processing of an image output apparatus on the basis of such a brightness evaluation value of the input image. The present invention is made in view of the above issues.

In a first aspect of the present invention, there is provided an image processing apparatus which includes: contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value; luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance. The image processing apparatus provides the effect of generating the boundary luminance value which separates the bright-side and the dark-side luminance in the contrast area where the contrast of luminance is greater.

In other words, even if the area of a subject varies, a light-and-dark ratio in its contrast area positioned along its contour does not vary. According to the first aspect of the present invention which takes note of the contrast area, it is possible to address the related art issue such that the evaluation value varies according to the area of each subject. In addition, a subject whose reflectance is relatively low compared to the ambient background is reproduced as a dark subject, while a subject whose reflectance is relatively high compared to the ambient background is reproduced as a bright subject. According to the first aspect of the present invention, it is possible to address the related art issue such that a subject of low reflectance is reproduced as an unnaturally bright subject, and a subject of high reflectance is reproduced as an unnaturally dark subject.

In the first aspect of the present invention, the contrast area detection means may include local contrast calculation means for calculating the contrast of the input luminance of each of the partial areas as a local contrast, and threshold decision means for determining whether the local contrast of the input luminance of each of the partial areas is greater than a predetermined threshold. The threshold decision means further determines that if the local contrast is greater than the predetermined threshold, the partial area corresponds to the contrast area. The contrast area detection means provides the effect of detecting the contrast area in accordance with the magnitude of the local contrast and the threshold. In this construction, the contrast calculation means may be adapted to calculate as the local contrast an absolute value of a local first order derivative of the input luminance of each of the partial areas, or to calculate as the local contrast an absolute value of a local second order derivative of the input luminance of each of the partial areas. Alternatively, the contrast calculation means may be adapted to calculate as the local contrast an absolute value of a difference between a maximum value and a minimum value of the input luminance of each of the partial areas.

In the first aspect of the present invention, the luminance distribution means may be adapted to distribute a maximum value of the input luminance into the bright-side luminance and a minimum value of the input luminance into the dark-side luminance for each of the local areas corresponding to the contrast area. Alternatively, the luminance distribution means may be adapted to distribute the input luminance of each of pixel positions corresponding to the contrast area into either of the bright-side luminance or the dark-side luminance according to the positive and negative of a local second order derivative of the input luminance of each of the pixel positions.

In the first aspect of the present invention, the boundary luminance value generation means may be adapted to generate a boundary luminance value $I_m$ ($E_{G=0} < I_m < E_{G=1}$) which is a solution of an equation:

$$\frac{-(I_m - E_{G=1})^2}{2V_{G=1}} - \frac{-(I_m - E_{G=0})^2}{2V_{G=0}} - \frac{1}{2}\log\frac{V_{G=1}}{V_{G=0}} = 0$$

as the boundary luminance value on the basis of a mean $E_{G=1}$ of the bright-side luminance, a variance $V_{G=1}$ of the bright-side luminance, a mean $E_{G=0}$ of the dark-side luminance, and a variance $V_{G=0}$ of the dark-side luminance. This construction is intended to generate the boundary luminance value by a discriminant analysis method. Alternatively, to generate the boundary luminance value $I_m$ ($E_{G=0} < I_m < E_{G=1}$), the above-mentioned quadratic equation may be simplified to the following equation:

$$\frac{(I_m - E_{G=1})^2}{V_{G=1}} = \frac{(I_m - E_{G=0})^2}{V_{G=0}}$$

In this case, the boundary luminance value $I_m$ can be found by solving a linear equation for the boundary luminance value $I_m$.

In a second aspect of the present invention, there is provided an image processing apparatus which includes: nonlinear transformation means for performing nonlinear transformation on the luminance of each pixel of an input image signal formed by a plurality of pixels; contrast area detection means for detecting a partial area from among partial areas in the input image signal as a contrast area, the contrast area being a partial area in which contrast of an input luminance, which is a luminance subjected to the nonlinear transformation, is greater than a predetermined value; luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance. The image processing apparatus provides the effect of generating the boundary luminance value which separates the bright-side luminance and the dark-side luminance in the contrast area where the contrast of the nonlinearly transformed luminance is greater.

In the second aspect of the present invention, the nonlinear transformation means may be adapted to perform the nonlinear transformation in accordance with a positive monotonic increasing function. Alternatively, in this case, the nonlinear transformation means may also be adapted to perform logarithmic transformation as the nonlinear transformation, or to perform gamma correction.

According to a third aspect of the present invention, there is provided an image capture apparatus which includes: image capture means for capturing an image of a subject and generating an input image signal formed by a plurality of pixels; contrast area detection means for detecting a partial area from among partial areas in an input image signal as a contrast area, the contrast area being a partial area in which contrast of an input luminance indicative of a luminance of the input image signal is greater than a predetermined value; luminance distribution means for distributing the input luminance in the contrast area into a bright-side luminance corresponding to a bright side of the input luminance and a dark-side luminance corresponding to a dark side of the input luminance; boundary luminance value generation means for generating a boundary luminance value between the bright-side luminance and the dark-side luminance on the basis of the distributions of the bright-side luminance and the dark-side luminance; and control means for controlling an exposure amount in the capture image on the basis of the bright luminance value. The image capture apparatus provides the effect of controlling an exposure amount on the basis of the boundary luminance value which separates the bright-side luminance and the dark-side luminance, in the contrast area where the contrast of luminance is greater.

According to a fourth aspect of the present invention, there is provided an image output apparatus which includes: contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value; luminance distribution means for distributing the input luminance in the contrast area into a bright-side luminance corresponding to a bright side of the input luminance and a dark-side luminance corresponding to a dark side of the input luminance; boundary luminance value generation means for generating a boundary luminance value between the bright-side luminance and the dark-side luminance on the basis of the distributions of the bright-side luminance and the dark-side luminance; and brightness correction means for performing brightness correction such that a luminance value of the input luminance which corresponds to the boundary luminance value is outputted as a moderate luminance value. The image output apparatus provides the effect of correcting an input image on the basis of the boundary luminance value which separates the bright-side luminance and the dark-side luminance, in the contrast area where the contrast of luminance is greater.

In the fourth aspect of the present invention, the brightness correction means may include: transformation curve calculation means for calculating a transformation curve to be used for compression of luminance gradation, on the basis of the boundary luminance value and the distribution of the input luminance; global luminance calculation means for calculating a global luminance indicative of the luminance of a global luminance image formed by low frequency components of the input image; gradation compression means for compressing the gradation of the input luminance and the gradation of the global luminance on the basis of the transformation curve; and contrast correction means for correcting the contrast of a gradation-compressed input image formed by the input luminance whose gradation is compressed on the basis of an inclination of the transformation curve and the gradation-compressed global luminance.

According to the embodiments of the present invention, it is possible to achieve the superior advantage such that the brightness of an input image is evaluated to make clear an area having a local difference in brightness between light and dark, thereby enabling an image capture apparatus to perform the exposure control on the basis of the evaluation value and/or enabling an image output apparatus to perform brightness correction on the basis of the evaluation value.

DETAILED DESCRIPTION OF EMBODIMENT

An embodiment of the present invention will be described below in detail with reference to the accompanying drawings.

Figure 1:
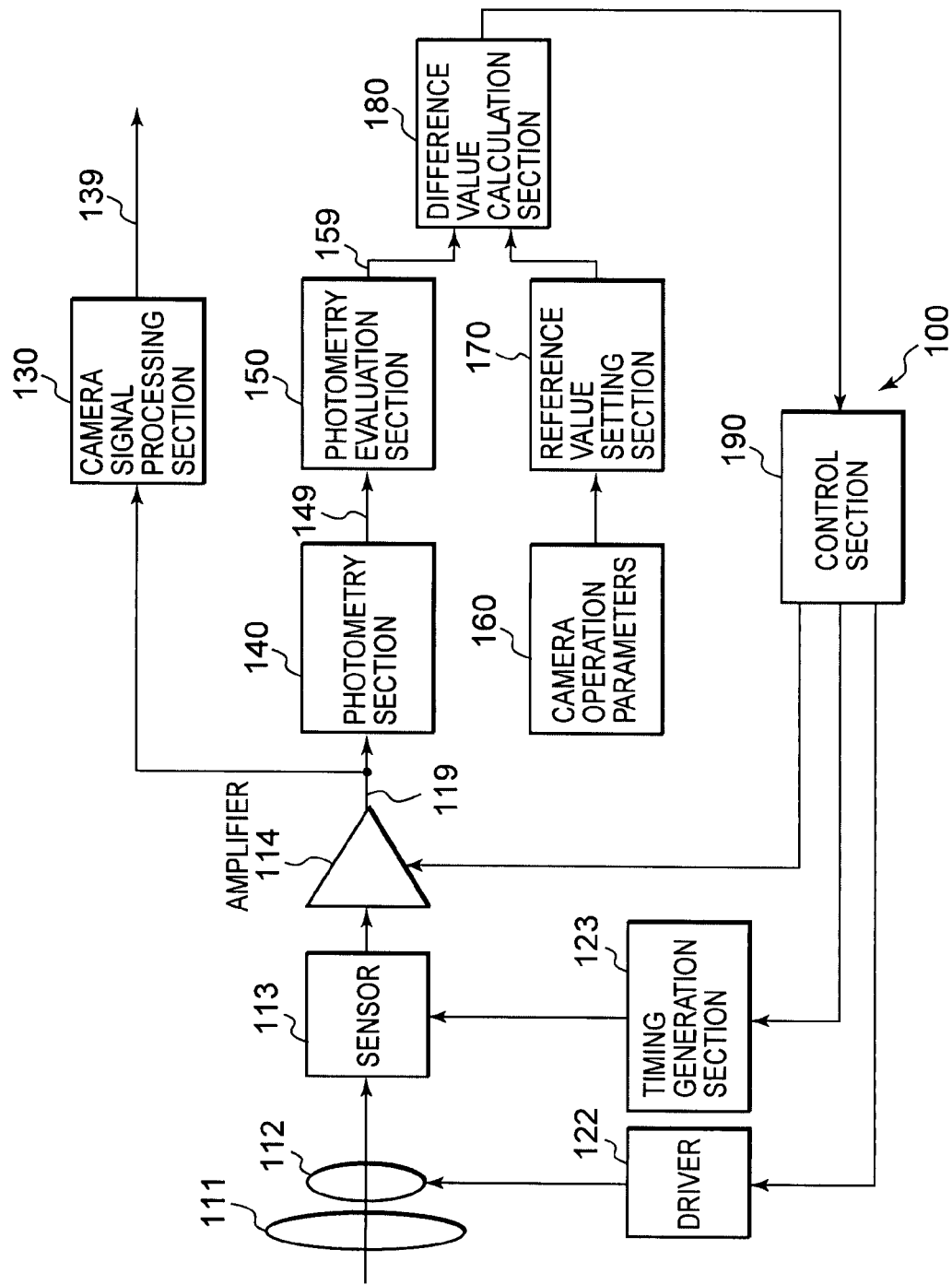
FIG. 1 is a diagram showing one example of the construction of a digital still camera according to an embodiment of the present invention.

FIG. 1 is a diagram showing one example of the construction of a digital still camera 100 according to an embodiment of the present invention. The digital still camera 100 includes a lens 111, a stop 112, a sensor 113, an amplifier 114, a driver 122, a timing generation section 123, a camera signal processing section 130, a photometry section 140, a photometry evaluation section 150, camera operation parameters 160, a reference value setting section 170, a difference value calculation section 180, and a control section 190.

The lens 111 collects a light image (incident light) of a subject. The stop 112 adjusts the amount of light of the light image collected by the lens 111. The incident light passes through the lens 111 and the stop 112 and reaches the sensor 113.

The sensor 113 converts the collected light image into an electrical signal through photoelectric conversion, and is realized by, for example, a CCD (Charge Coupled Devices) image sensor or the like. The amplifier 114 amplifies (gains up) the image signal photoelectrically converted by the sensor 113. The image signal amplified by the amplifier 114 is supplied to the camera signal processing section 130 and the photometry section 140 via a signal line 119. The driver 122 drives the stop 112 to adjust the amount of aperture thereof. The timing generation section 123 drives the sensor 113 to adjust the charge storage time thereof.

The camera signal processing section 130 performs signal processing, such as demosaicing, gamma correction and color correction, on the image signal supplied from the amplifier 114 via the signal line 119. The image signal subjected to the signal processing by the camera signal processing section 130 is outputted from a signal line 139 and is used for recording on a recording medium and display on a display section.

The photometry section 140 outputs the measured results of brightness of individual sections of the image signal supplied from the amplifier 114 via the signal line 119. The measured results outputted from the photometry section 140 are supplied to the photometry evaluation section 150 via a signal line 149.

The photometry evaluation section 150 generates a photometry evaluation value which evaluates the brightness of the image signal, on the basis of the measured results supplied from the photometry section 140 via the signal line 149. The photometry evaluation value generated by the photometry evaluation section 150 is supplied to the difference value calculation section 180 via a signal line 159.

The camera operation parameters 160 are parameters indicative of the current operating status of the digital still camera 100. The reference value setting section 170 refers to the camera operation parameters 160 and sets a reference value indicative of standard brightness. As the reference value, it is preferable to select, for example, approximately 18 to 20% which can be converted to 0.4 to 0.5 by gamma curve.

The difference value calculation section 180 compares the photometry evaluation value generated by the photometry evaluation section 150 with the reference value set by the reference value setting section 170, and calculates a difference value as the amount of deviation between the photometry evaluation value and the reference value.

The control section 190 generates control signals which adjust the amount of aperture of the stop 112 of the optical system, the charge storage time of the sensor 113, the amount of amplification by the amplifier 114, and the like, in the direction in which the difference value calculated by the difference value calculation section 180 approaches 0. The control signals generated by the control section 190 are respectively supplied to the stop 112, the sensor 113, the amplifier 114, and the like, and each of these sections operates on the basis of the respective one of the control signals so as to provide an appropriate amount of exposure.

Figure 2:
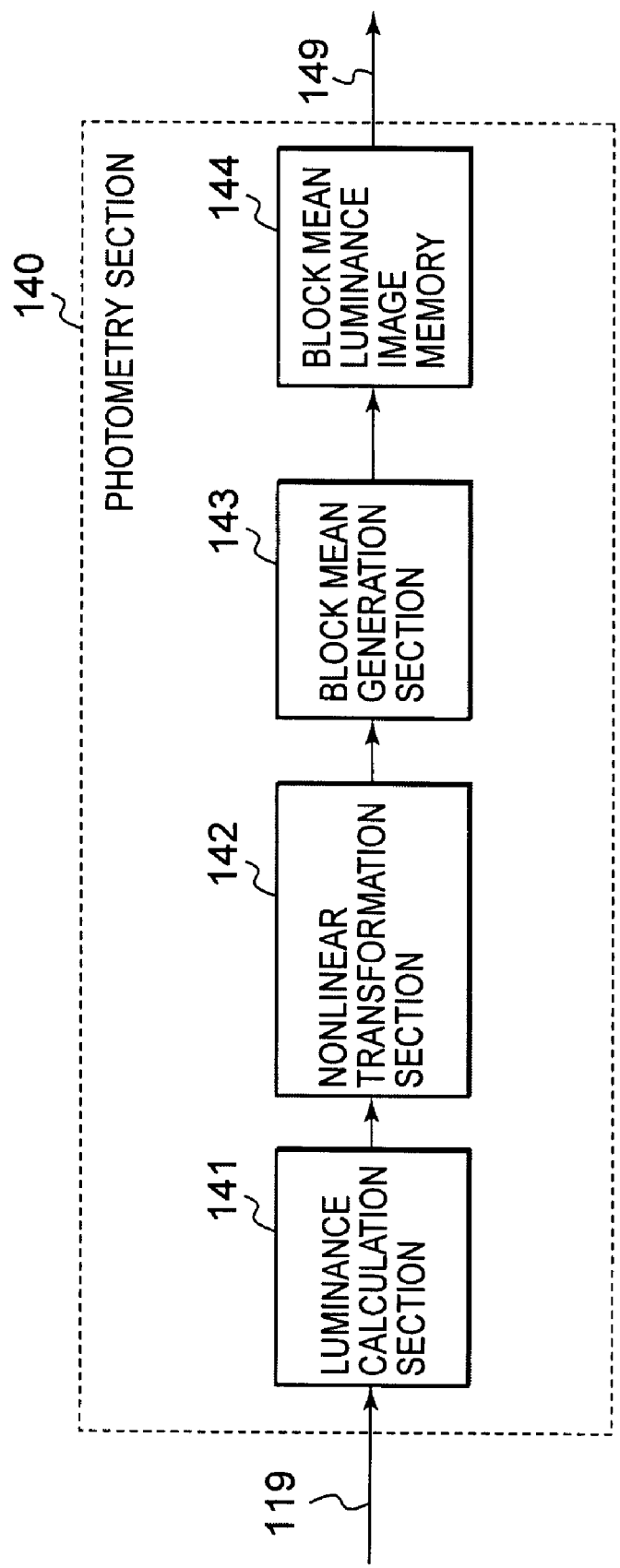
FIG. 2 is a block diagram showing one example of the construction of a photometry section in an embodiment of the present invention.

FIG. 2 is a block diagram showing one example of the construction of the photometry section 140 in the present embodiment. The photometry section 140 includes a luminance calculation section 141, a nonlinear transformation section 142, a block mean generation section 143, and a block mean luminance image memory 144.

The luminance calculation section 141 calculates the luminance of each pixel on the input image signal supplied from the amplifier 114 via the signal line 119. Since general color sensors can only measure any one color for each pixel, the processing of temporarily calculating luminance from the output of such a sensor is needed to measure the luminance of an image.

The nonlinear transformation section 142 performs nonlinear transformation on the luminance of each pixel calculated by the luminance calculation section 141. The nonlinear transformation may make use of, for example, positive monotonic increasing functions in addition to logarithmic transformation, gamma correction and the like. The nonlinear transformation is performed to store a histogram shape for scaling operation for brightness correction.

The block mean generation section 143 generates the mean of the nonlinearly transformed luminances as block mean luminance for each of individual blocks into which an image represented by the image signal nonlinearly transformed by the nonlinear transformation section 142 is divided in a gridlike manner. In other words, the block mean generation section 143 determines which of the blocks each pixel position belongs to, then finds an integration value of the block of interest by adding the nonlinearly transformed luminances, and then calculates the mean of the nonlinearly transformed luminances within the block by dividing the integration value by the number of pixels belonging to the block. An image whose constituent pixels are blocks divided by the block mean generation section 143 is hereinafter called a block mean image, and the constituent pixels are hereinafter called block pixels. In other words, the luminance of a block pixel is the block mean luminance of the block. In addition, one block may have a size of 40×30 pixels or 32×32 pixels.

The block mean luminance image memory 144 stores the block mean image generated by the block mean generation section 143. The block mean image stored in the block mean luminance image memory 144 is supplied to the photometry evaluation section 150 via the signal line 149 as the measured result from the photometry section 140.

Figure 3A:
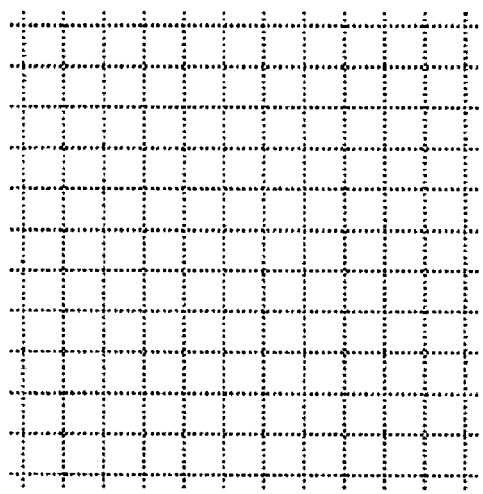
FIGS. 3A to 3C are schematic views showing one example of generation of a block mean image in an embodiment of the present invention.
Figure 3B:
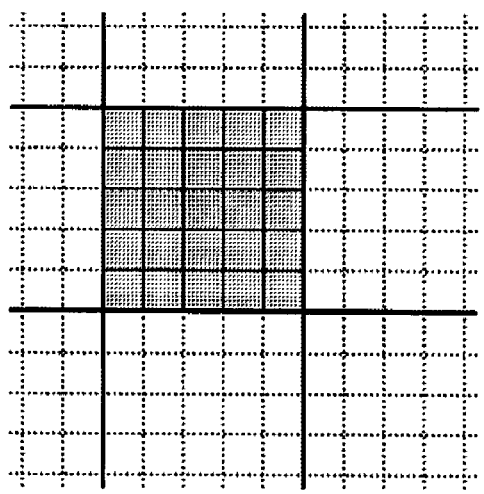
Figure 3C:
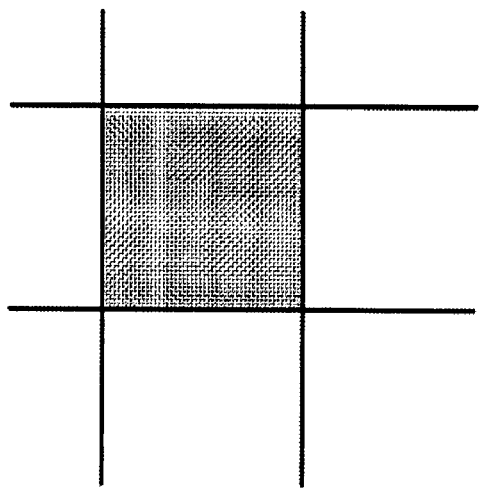

FIGS. 3A to 3C are schematic views showing one example of generation of the block mean image in the present embodiment. FIG. 3A shows pixels which are not yet be divided into blocks. Luminance calculated by the luminance calculation section 141 is nonlinearly transformed by the nonlinear transformation section 142, and the pixels are divided into blocks as shown by thick lines in FIG. 3B.

Then, the mean of luminances belonging to the respective blocks (nonlinearly transformed luminance) is calculated as block mean luminance by the block mean generation section 143. FIG. 3C shows the state of the block mean luminance. In this manner, the block mean image is generated.

Figure 4:
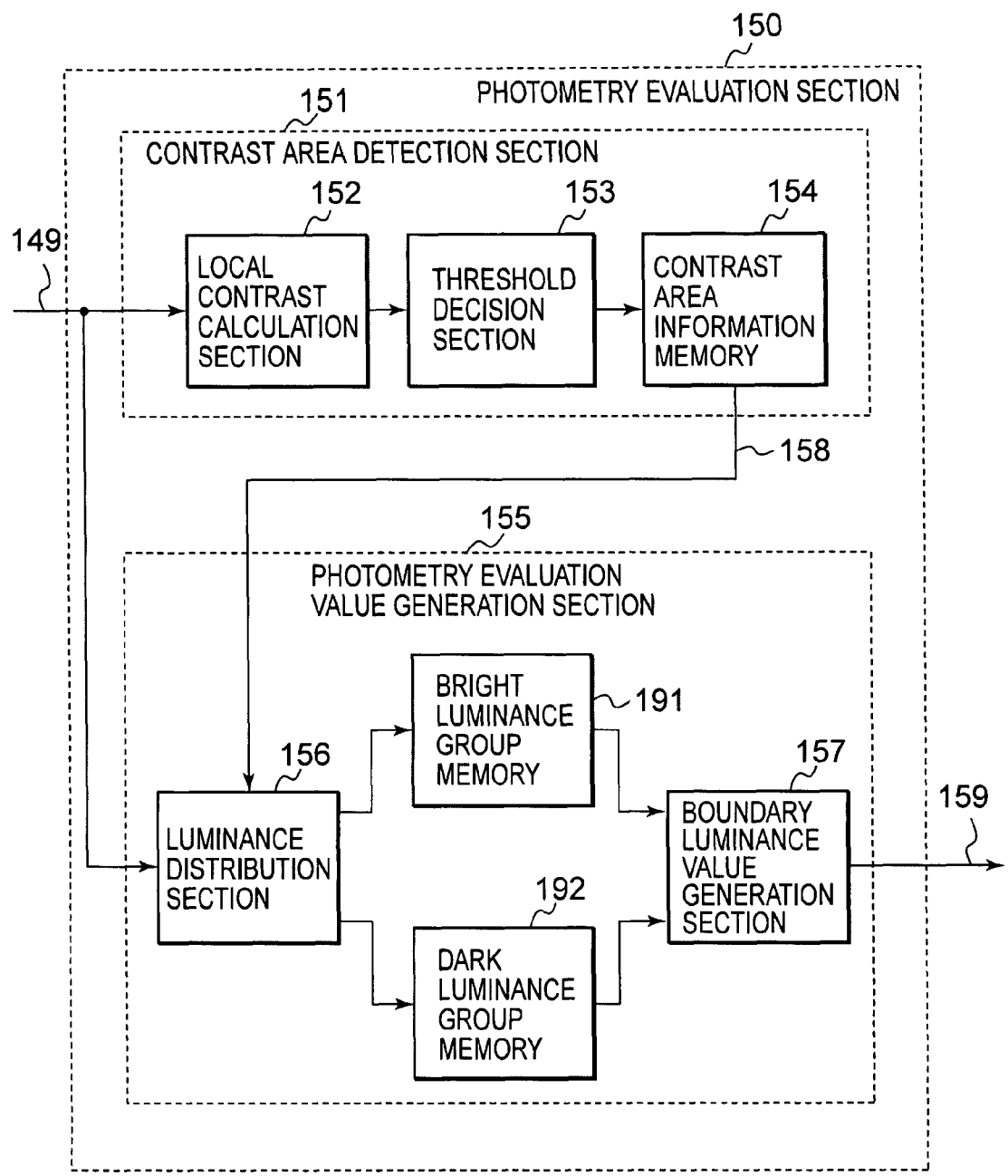
FIG. 4 is a block diagram showing one example of the construction of a photometry evaluation section in an embodiment of the present invention.

FIG. 4 is a block diagram showing one example of the construction of the photometry evaluation section 150 in the present embodiment. The photometry evaluation section 150 includes a contrast area detection section 151 and a photometry evaluation value generation section 155. The contrast area detection section 151 detects partial areas, whose contrasts of luminance (luminance differences) are greater than a predetermined value, as contrast areas from partial areas in the block mean image. The photometry evaluation value generation section 155 generates a photometry evaluation value of the block mean image for the contrast areas detected by the contrast area detection section 151.

The contrast area detection section 151 includes a local contrast calculation section 152, a threshold decision section 153, and a contrast area information memory 154.

The local contrast calculation section 152 calculates the contrast of luminance (luminance difference) of each of the partial areas as a local contrast. To calculate the local contrast, it is preferable to use the absolute value of the local first order derivative or the local second order derivative of the luminance of the block mean image. It is also preferable to use the difference between a local maximum value and a local minimum value instead of such a differential operator.

The threshold decision section 153 compares whether the value of the local contrast calculated by the local contrast calculation section 152 is larger than a predetermined threshold, and if the local contrast is greater than the threshold value, determines that the partial area is a contrast area.

The contrast area information memory 154 is a memory which stores information indicative of whether each block pixel of the block mean image corresponds to the contrast area, as contrast area information. For example, the contrast area information memory 154 stores on a bit-by-bit basis binary data indicative of whether each block pixel of the block mean image corresponds to the contrast area. The contrast area information is supplied to the photometry evaluation value generation section 155 via a signal line 158.

The photometry evaluation value generation section 155 includes a luminance distribution section 156, a bright-side luminance group memory 191, a dark-side luminance group memory 192, and a boundary luminance value generation section 157.

The luminance distribution section 156 distributes the luminances of the individual pixels of the contrast area indicated by the contrast area information supplied via the signal line 158, into bright luminances (hereinafter called bright-side luminance) and dark luminances (hereinafter called dark-side luminance). For example, for each local area corresponding to the contrast area, the maximum value of luminance may be distributed into the bright-side luminance, while the minimum value of luminance may be distributed into the dark-side luminance. Alternatively, for each pixel position corresponding to the contrast area, the luminance of the pixel position may be distributed into the bright-side luminance and the dark-side luminance on the basis of the positive and negative of the local second order derivative of the luminance. For example, in the case where a two-dimensional synthesis of one-dimensional second order differential operators [1, −2, 1] is used as a second order differential operator to be applied to an image, if the output of the second order differential operator is negative, the luminance of the corresponding pixel position is distributed into the bright-side luminance, whereas if positive, the luminance of the corresponding pixel is distributed into the dark-side luminance. In addition, in the field of image processing, a positive-negative inverted version of the second order differential operator may also be used as a second order differential operator, but in this case it is necessary to invert the above-mentioned decision rules as to the bright-side luminance and the dark-side luminance.

In addition, if the contrast area detection section 151 is constructed to find the local contrast from the absolute value of the local first order derivative of luminance or from the absolute value of the difference between the local maximum value and the local minimum value, it is preferable that the luminance distribution section 156 be constructed to distribute luminance on the basis of the maximum and minimum values of luminance. On the other hand, if the contrast area detection section 151 is constructed to find the local contrast from the absolute value of the local second order derivative of luminance, it is efficient that the luminance distribution section 156 be constructed to distribute luminance on the sign of the local second order derivative of luminance. These combinations, however, are not to be construed as limitative.

The bright-side luminance group memory 191 stores the luminances (nonlinearly transformed luminances) distributed into the bright-side luminance by the luminance distribution section 156. The dark-side luminance group memory 192 stores the luminances (nonlinearly transformed luminances) distributed into the dark-side luminance by the luminance distribution section 156.

The boundary luminance value generation section 157 generates a boundary luminance value between the bright-side luminance and the dark-side luminance on the basis of the distribution of the bright-side luminance stored in the bright-side luminance group memory 191 and the distribution of the dark-side luminance stored in the dark-side luminance group memory 192. In other words, the boundary luminance value generation section 157 generates a boundary luminance value suitable for separating the bright-side luminance and the dark-side luminance as appropriately as possible. The boundary luminance value generated by the boundary luminance value generation section 157 is outputted via the signal line 159 as a photometry evaluation value.

In the present embodiment, to generate the boundary luminance value, a discriminant analysis method is used as follows. In other words, when a certain luminance value I is given, the luminance value I is distributed into either of the dark-side luminance group or the bright-side luminance group, which the luminance value I will belong to with a higher posterior probability. It is assumed here that G represents a random variable indicating which of the groups the luminance value I belongs to, and that when the luminance value I belongs to the dark-side luminance group, G=0, whereas when the luminance value I belongs to the bright-side luminance group, G=1. The ratio, $\Lambda$, of the posterior probabilities that the luminance value I belongs to the respective groups is given by the following equation.

$$\Lambda = \frac{p(G=1 \mid I)}{p(G=0 \mid I)} \qquad \text{[Equation 1]}$$

$$= \frac{p(G=1, I)}{p(G=0, I)}$$

$$= \frac{p(I \mid G=1)p(G=1)}{p(I \mid G=0)p(G=0)}$$

When the logarithm of the ratio $\Lambda$ is taken, if log $\Lambda$<0, it can be determined that the luminance value I belongs to the dark-side luminance group, whereas if log $\Lambda$>0, it can be determined that the luminance value I belongs to the bright-side luminance group. If log $\Lambda$=0, the luminance value I lies on a boundary luminance which separates both groups. In addition, the base of the logarithm may be arbitrary, and an appropriate logarithm such as a common logarithm or a natural logarithm may be selected.

P(I|G) represents the luminance distribution of each of the dark-side luminance group (G=0) and the bright-side luminance group (G=1). To apply discriminant analysis, it is assumed here that the distribution on the luminance axis of each of the dark-side luminance group and the bright-side luminance group obtained from the contrast areas of the block mean image follows a normal distribution.

P(G) represents a probability indicating which of the groups the luminance value I belongs to irrespective of luminance values. In the present embodiment, since notice is taken of the dark-side luminance and the bright-side luminance of the contrast areas, the numbers of data belonging to both groups are approximately the same and p(G) may be considered to be p(G=0)=p(G=1). Accordingly, for a boundary luminance value $I_m$ which separates both groups, the following equation can be obtained:

$$\log \Lambda(I_m) = \log \frac{p(I_m \mid G=1)p(G=1)}{p(I_m \mid G=0)p(G=0)} \qquad \text{[Equation 2]}$$

$$= \frac{-(I_m - E_{G=1})^2}{2V_{G=1}} - \frac{-(I_m - E_{G=0})^2}{2V_{G=0}} - \frac{1}{2}\log\frac{V_{G=1}}{V_{G=0}}$$

$$= 0$$

where the mean of the bright-side luminance is $E_{G=1}$, the variance of the bright-side luminance is $V_{G=1}$, the mean of the dark-side luminance is $E_{G=0}$, and the variance of the dark-side luminance is $V_{G=0}$. This equation is a quadratic equation for the boundary luminance value $I_m$ and has two solutions. If a solution lying in the range $E_{G=0} < I_m < E_{G=1}$ is selected from both solutions, it is possible to find the boundary luminance value $I_m$.

In the above description, quadratic discriminant analysis has been referred to as an example of discriminant analysis, but another method such as linear discriminant analysis or a support vector machine may also be used. For example, in the case of linear analysis, the above-mentioned equation is simplified as follows. The following equation is a linear equation for the boundary luminance value $I_m$ ($E_{G=0} < I_m < E_{G=1}$).

$$\frac{(I_m - E_{G=1})^2}{V_{G=1}} = \frac{(I_m - E_{G=0})^2}{V_{G=0}} \qquad \text{[Equation 3]}$$

Figure 5:
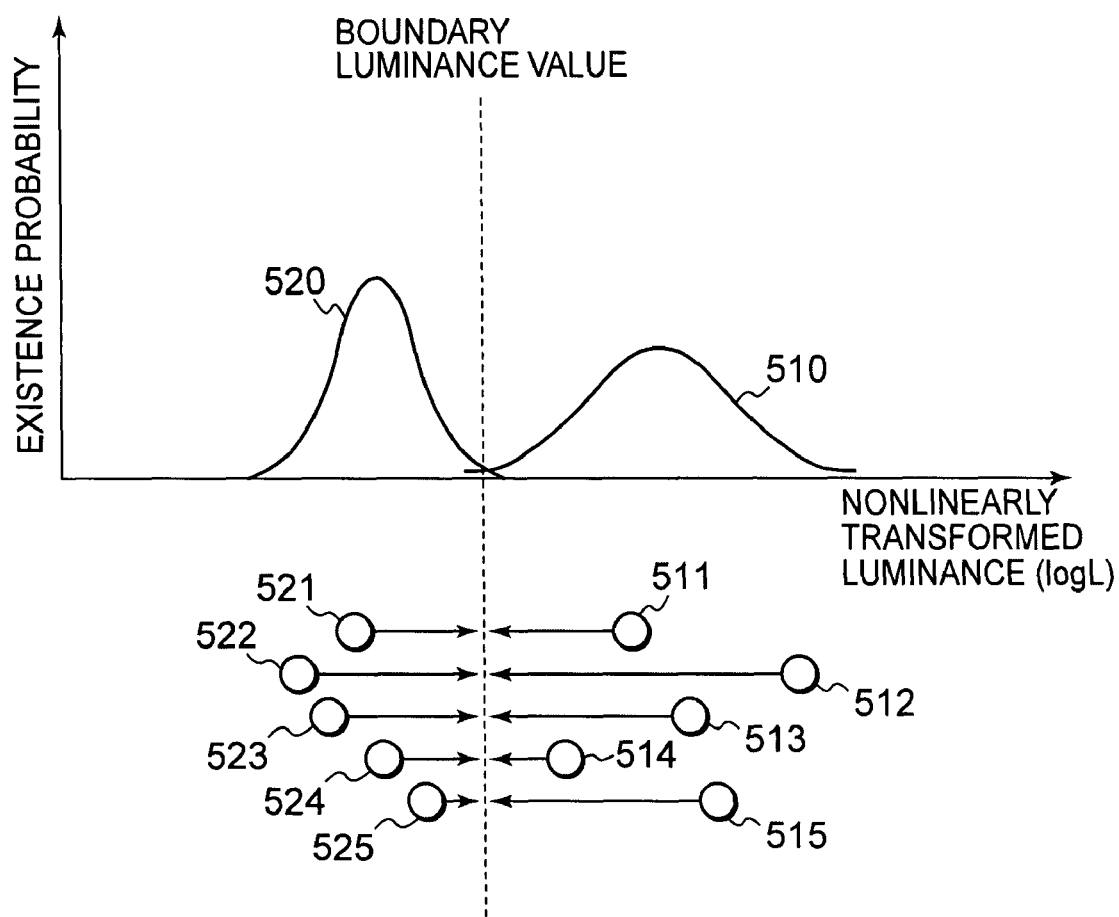
FIG. 5 is a graph showing an example of generation of a boundary luminance value in an embodiment of the present invention.

FIG. 5 is a graph showing an example of generation of the boundary luminance value in the present embodiment. In FIG. 5, there are shown five sets of bright-side luminance and dark-side luminance in a contrast area; that is to say, a first set of a bright-side luminance 511 and a dark-side luminance 521, a second set of a bright-side luminance 512 and a dark-side luminance 522, a third set of a bright-side luminance 513 and a dark-side luminance 523, a fourth set of a bright-side luminance 514 and a dark-side luminance 524, and a fifth set of a bright-side luminance 515 and a dark-side luminance 525. Each of these sets is a set which indicates the maximum value and the minimum value of luminance or which is distributed on the basis of the sign of the local second order derivative of luminance by the luminance distribution section 156.

The distribution graph shown in the stop section of FIG. 5 represents the distribution of these sets, i.e., the distribution of a bright-side luminance group 510 and a dark-side luminance group 520. The horizontal axis of the distribution graph represents nonlinearly transformed luminance (in the example shown in FIG. 5, the logarithm of a luminance L), and the luminance becomes brighter toward the right. The vertical axis of the distribution graph represents the existence probability of each luminance, and the existence probability becomes higher toward the top.

As mentioned above, the boundary luminance value is obtained by solving the equation (Equation 2). This boundary luminance value separates the bright-side luminance group 510 and the dark-side luminance group 520.

Figure 6A:
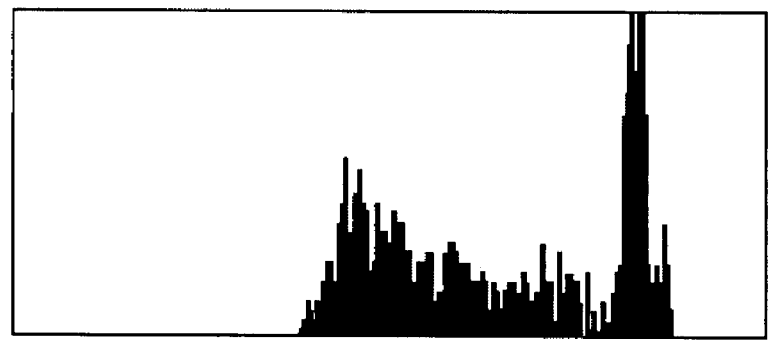
FIGS. 6A to 6C are graphs showing an example of generation of a bright-side luminance group and a dark-side luminance group in an embodiment of the present invention.
Figure 6B:
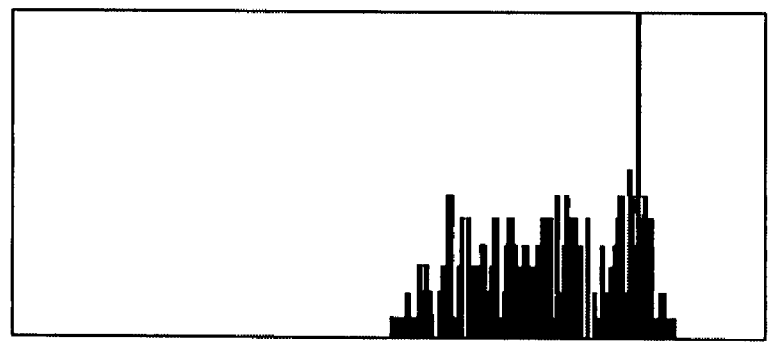
Figure 6C:
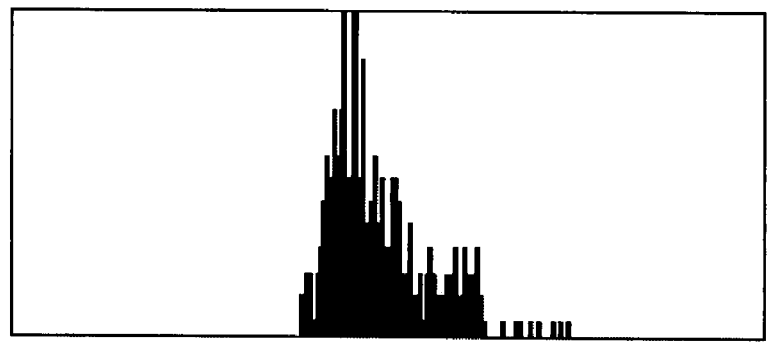

FIGS. 6A to 6C are graphs showing an example of generation of a bright-side luminance group and a dark-side luminance group in the present embodiment. FIG. 6A shows a histogram example before the bright-side luminance and the dark-side luminance of nonlinearly transformed luminance are separated from each other. When a boundary luminance value is found from an image showing such distribution, the distributions shown in FIGS. 6B and 6C are obtained. FIG. 6B shows a histogram example of the bright-side luminance group of nonlinearly transformed luminance, while FIG. 6C shows a histogram example of the dark-side luminance group of nonlinearly transformed luminance.

These histogram examples are normalized by the maximum values of the respective existence probabilities.

Figure 7:
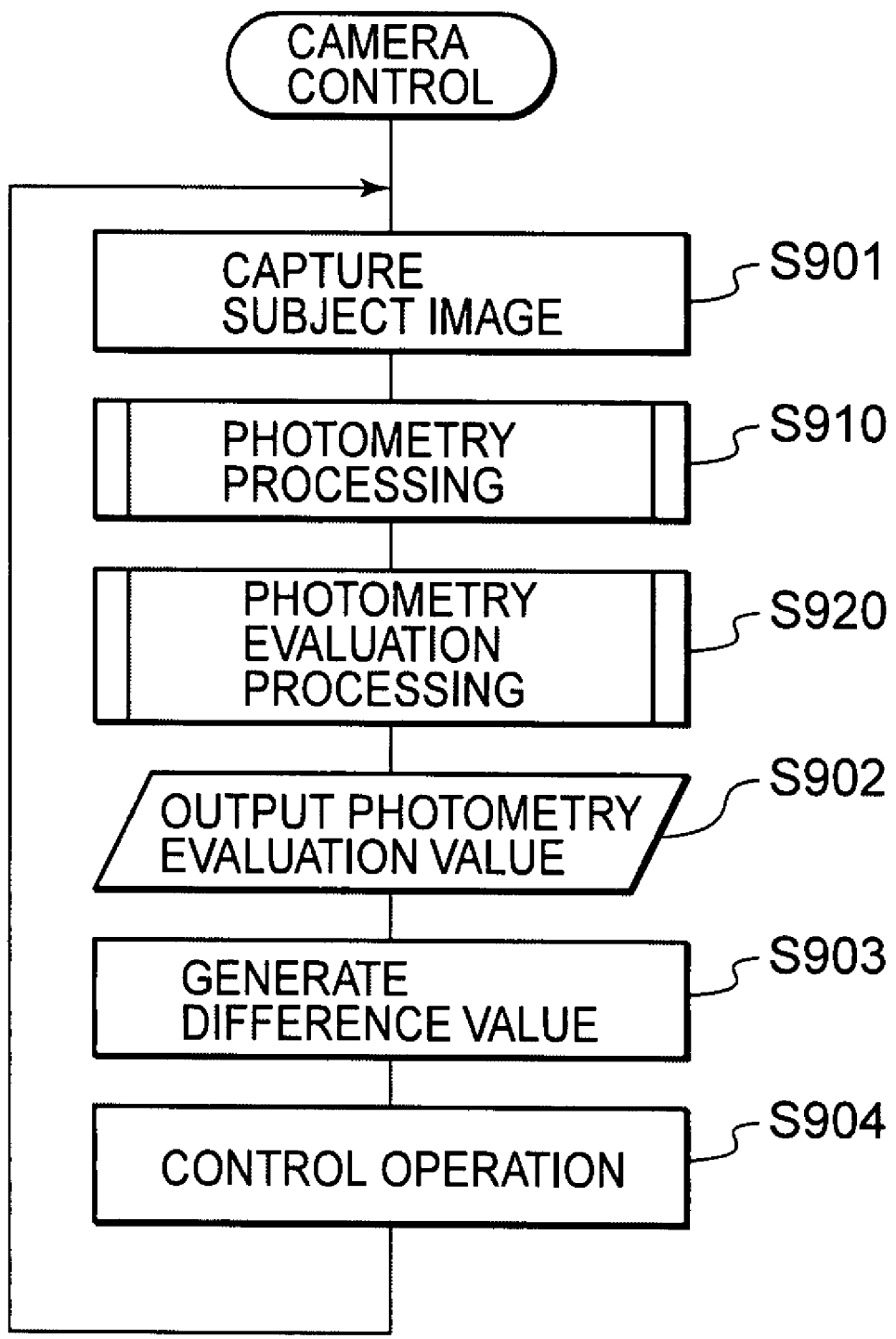
FIG. 7 is a flowchart showing one example of the control sequence of the digital still camera according to an embodiment of the present invention.

FIG. 7 is a flowchart showing one example of the control sequence of the digital still camera 100 according to an embodiment of the present invention. First, if incident light from a subject passes through the optical system such as the lens 111 and the stop 112 and is captured by the sensor 113 (step S901), the photometry section 140 performs photometry processing on the input image amplified by the amplifier 114 (step S910). Then, on the basis of the measured result of the photometry processing, the photometry evaluation section 150 performs photometry evaluation processing (step S920).

When a photometry evaluation value obtained by the photometry evaluation processing is outputted (step S902), the difference value calculation section 180 generates the difference value between the photometry evaluation value and a reference value set by the reference value setting section 170 (step S903). The control section 190 performs operation control by generating control signals for the driver 122, the timing generation section 123, the amplifier 114 and the like on the basis of the generated difference value. (Step S904).

Figure 8:
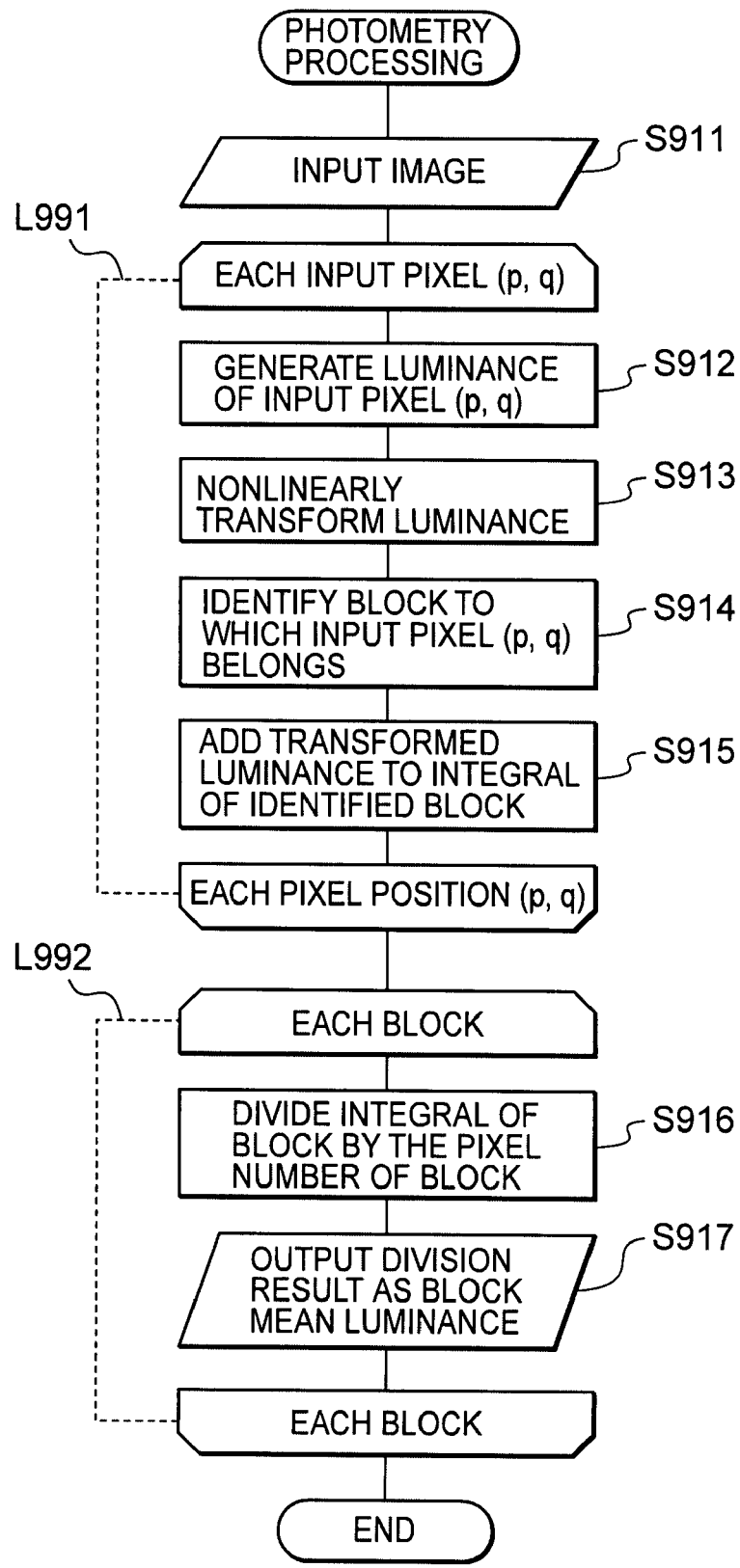
FIG. 8 is a flowchart showing one example of the processing sequence of photometry processing in an embodiment of the present invention.

FIG. 8 is a flowchart showing one example of the processing sequence of the photometry processing (step S910) in the present embodiment. When the amplified input image is inputted via the signal line 119 (step S911), the following processing is performed on each pixel of the input image (loop L991). In the following description, each pixel of the input image is represented by two-dimensional coordinates (p, q), where p and q are integers greater than or equal to 0.

First, the luminance of the input pixel (p, q) is calculated by the luminance calculation section 141 (step S912) The calculated luminance is nonlinearly transformed by the nonlinear transformation section 142 (step S913).

Then, the block mean generation section 143 identifies a block to which the input pixel (p, q) belongs (step S914), and the nonlinearly transformed luminance of the input pixel (p, q) is added to a variable which stores the integration value of the identified block (step S915).

When the above-mentioned processing is performed on all input pixels (p, q) in loop L991, the following processing is performed on each block (loop L992). In other words, the processing of dividing the integration value of each block by the number of pixels of the block is performed (step S916). The division result is stored into the block mean luminance image memory 144 as the block mean luminance of each block (step S917).

Figure 9:
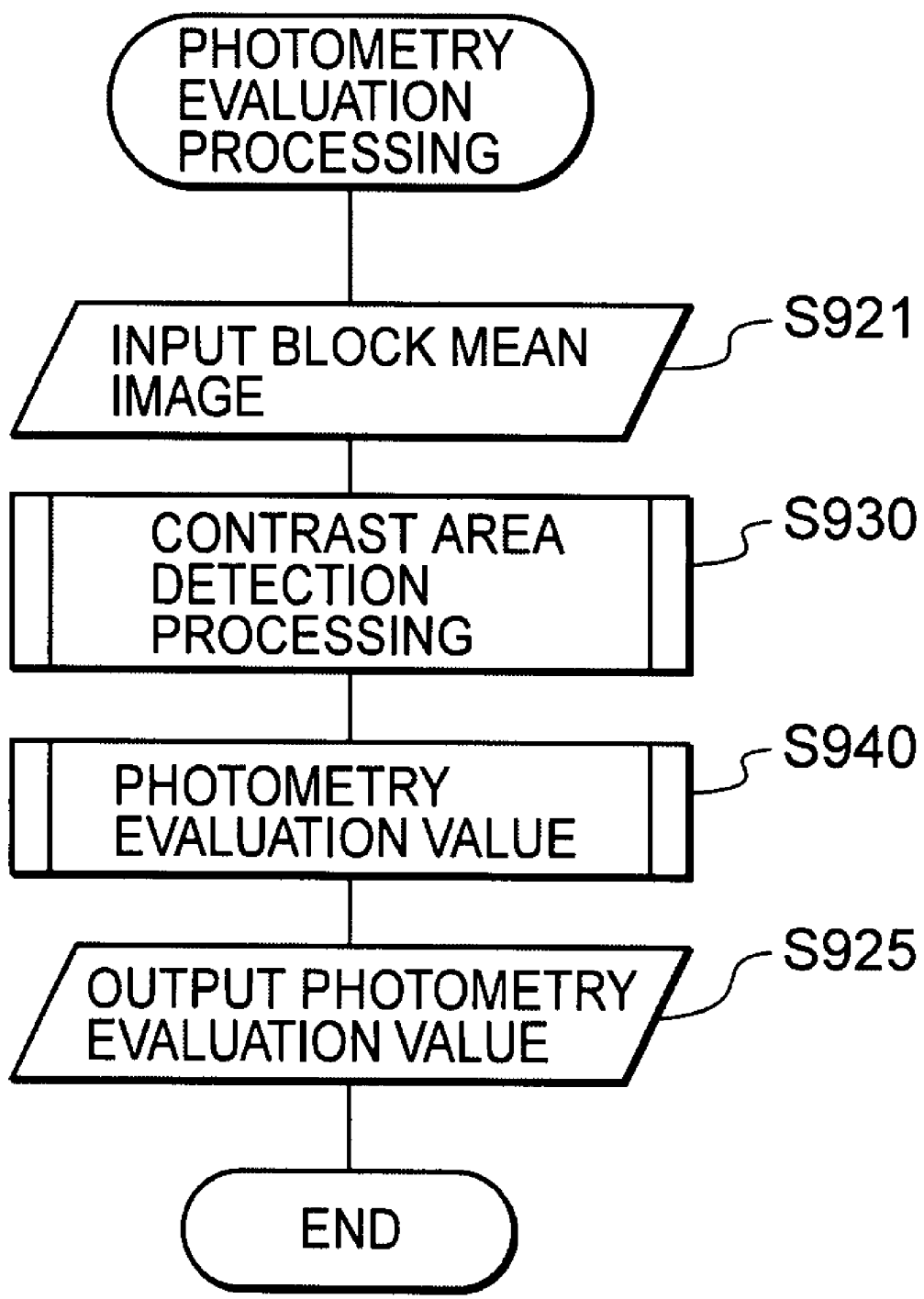
FIG. 9 is a flowchart showing one example of the processing sequence of photometry evaluation processing in an embodiment of the present invention.

FIG. 9 is a flowchart showing one example of the processing sequence of the photometry evaluation processing (step S920) in the present embodiment. When the block mean image is inputted via the signal line 149 (step S921), the contrast area detection section 151 performs the processing of detecting a contrast area in the block mean image (step S930). The contrast area detected by the contrast area detection section 151 is subjected to photometry evaluation value generation processing in the photometry evaluation value generation section 155 (step S940). The generated photometry evaluation value is outputted via the signal line 159 (step S925).

Figure 10:
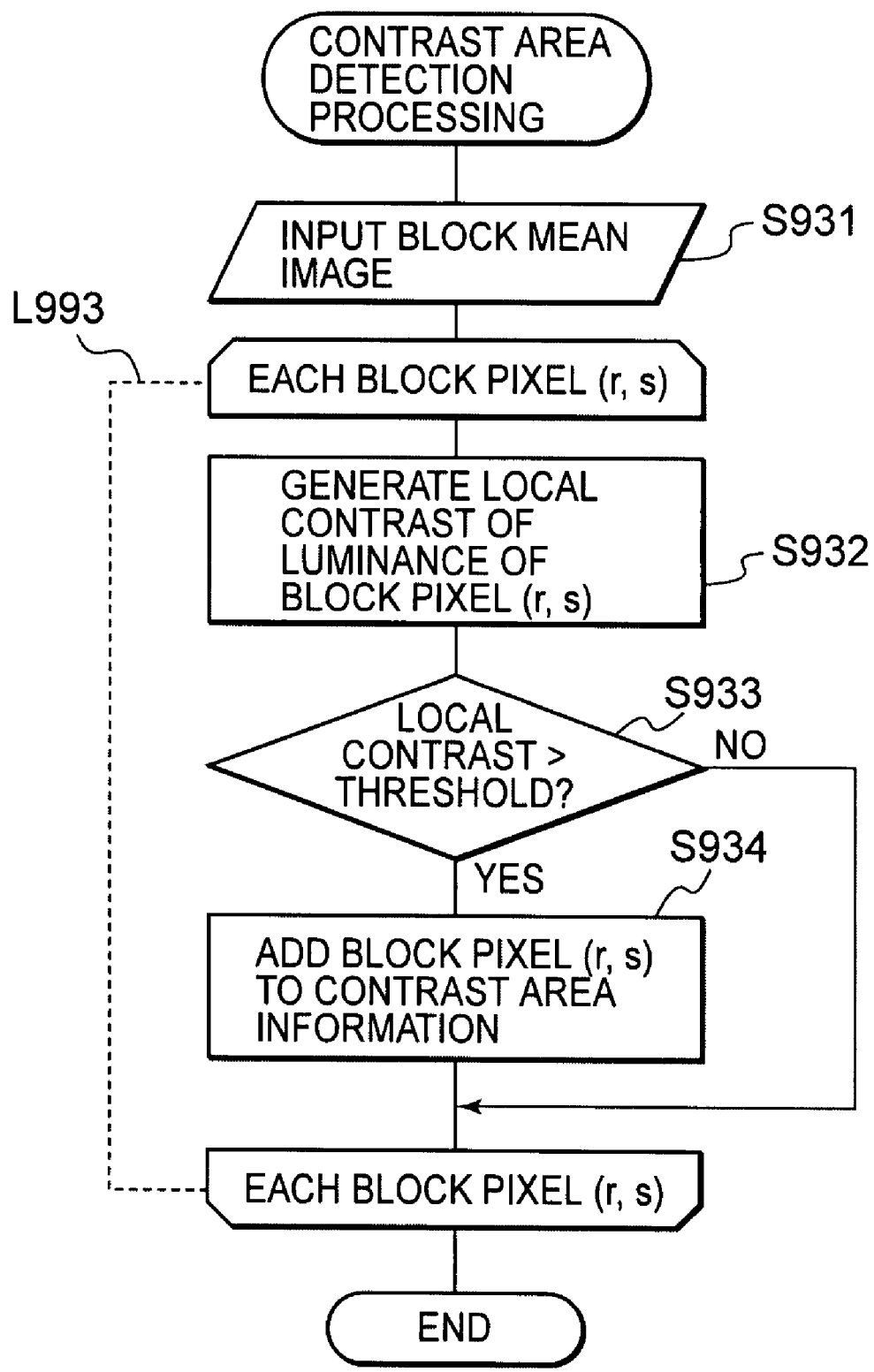
FIG. 10 is a flowchart showing one example of the processing sequence of contrast area detection processing in an embodiment of the present invention.

FIG. 10 is a flowchart showing one example of the processing sequence of the contrast area detection processing (step S930) in the present embodiment. When the block mean image is inputted via the signal line 149 (step S931), the following processing is performed on each pixel of the block mean image (loop L993). In the following description, each pixel of the block mean image is represented by two-dimensional coordinates (r, s), where r and s are integers greater than or equal to 0.

First, the local contrast of the luminance of the pixel (r, s) of the block mean image is calculated by the local contrast calculation section 152 (step S932). As mentioned previously, to calculate the local contrast, it is preferable to use, for example, the absolute value of the local first order derivative or the local second order derivative of the luminance of the block mean image.

If the generated local contrast is greater than a threshold (step S933), contrast area information indicating that the pixel (r, s) is a contrast area is stored into the contrast area information memory 154 by the threshold decision section 153 (step S934). The contrast area information is supplied to the luminance distribution section 156 of the photometry evaluation value generation section 155 via the signal line 158.

Figure 11:
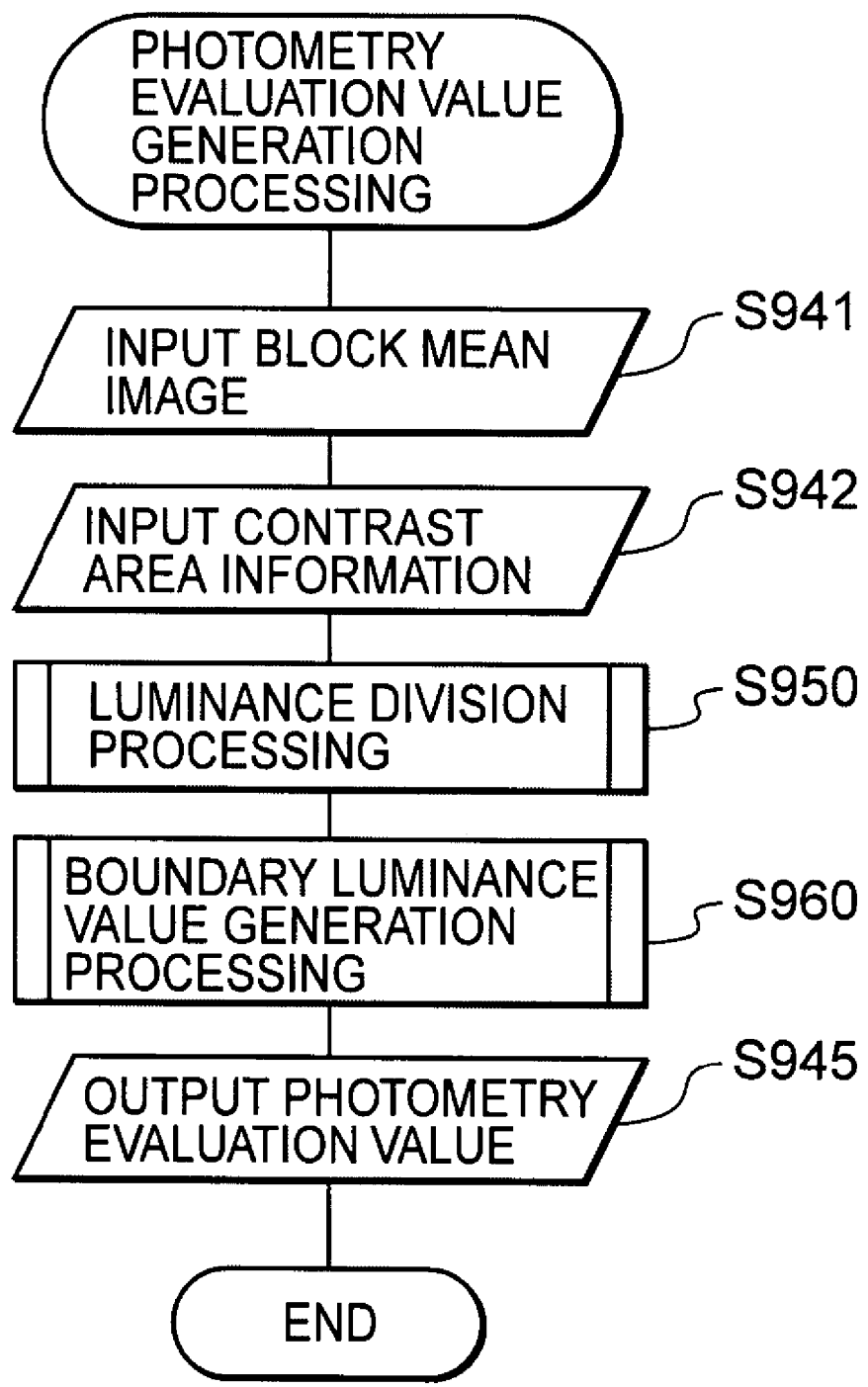
FIG. 11 is a flowchart showing one example of the processing sequence of photometry evaluation value generation processing in an embodiment of the present invention.

FIG. 11 is a flowchart showing one example of the processing sequence of the photometry evaluation value generation processing (step S940) in the present embodiment. When the block mean image is inputted via the signal line 149 (step S941) and the contrast area information is inputted via the signal line 158 (step S942), the processing of performing luminance distribution into the bright-side luminance or the dark-side luminance is performed by the luminance distribution section 156 (step S950). Then, the boundary luminance value generation section 157 performs boundary luminance value generation processing on the basis of the distributions of the bright-side luminance and the dark-side luminance (step S960). A boundary luminance value generated by the boundary luminance value generation processing is outputted as a photometry evaluation value via the signal line 159 (step S945).

Figure 12:
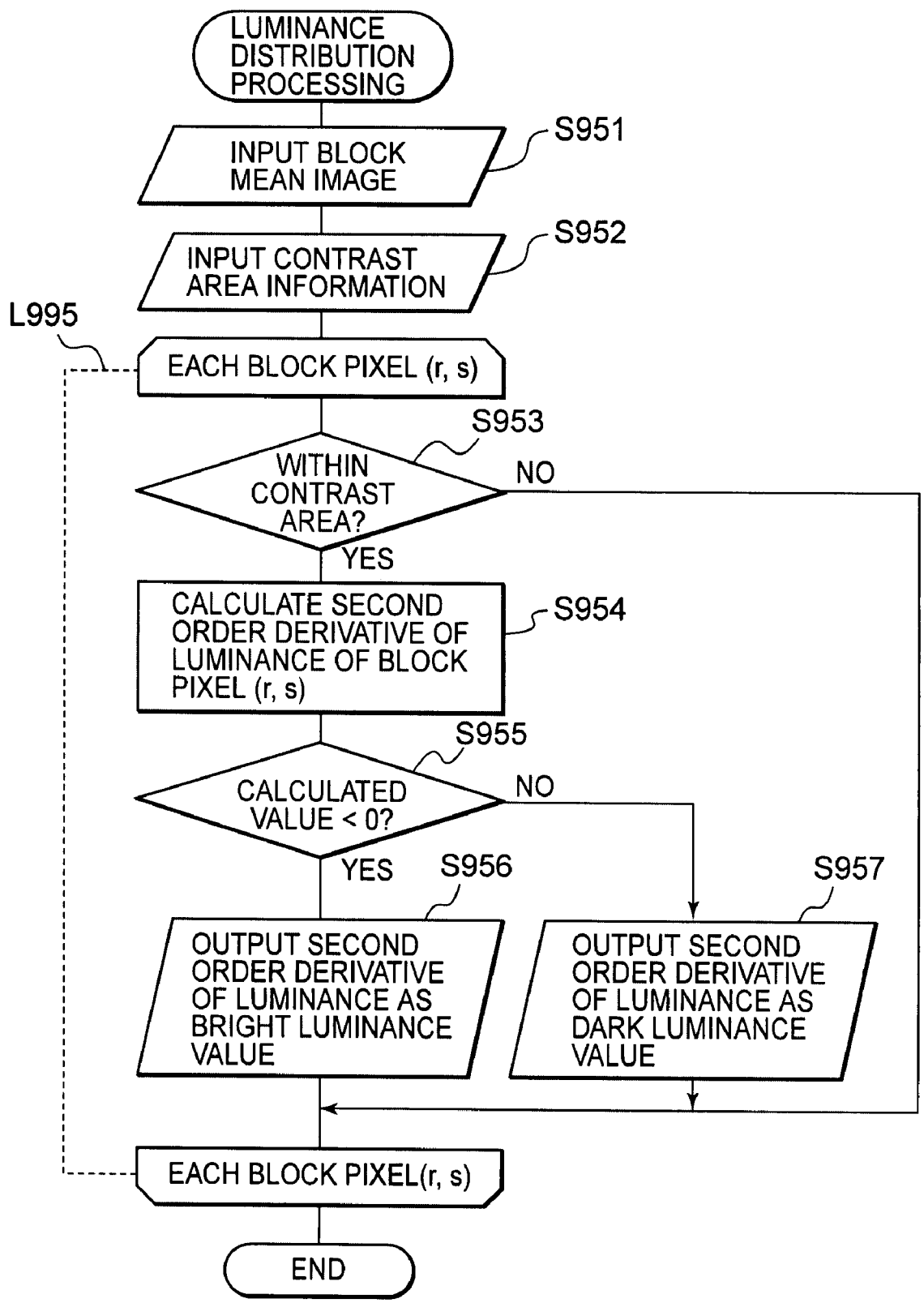
FIG. 12 is a flowchart showing one example of the processing sequence of luminance distribution processing in an embodiment of the present invention.

FIG. 12 is a flowchart showing one example of the processing sequence of the luminance distribution processing (step S950) in the present embodiment. When the block mean image is inputted via the signal line 149 (step S951) and the contrast area information is inputted via the signal line 158 (step S952), the following processing is performed on each pixel of the block mean image (loop L995). In the following description, each pixel of the block mean image is represented by two-dimensional coordinates (r, s), where r and s are integers greater than or equal to 0.

First, if the contrast area information indicates that the pixel (r, s) of the block mean image is located within the contrast area (step S953), the luminance distribution section 156 distributes the luminance of the pixel (r, s) into the bright-side luminance or the dark-side luminance. In the shown example, the sign of the local second order derivative of luminance is used as a criterion for distribution. In other words, the local second order derivative of the luminance of the pixel (r, s) is calculated (step S954). If the calculated local second order derivative is less than 0 (step S955), the value of the local second order derivative is stored in the bright-side luminance group memory 191 as a bright-side luminance value (step S956). On the other hand, if the calculated local second order derivative is not less than 0 (step S955), the value of the local second order derivative is stored in the dark-side luminance group memory 192 as a dark-side luminance value (step S957).

Figure 13:
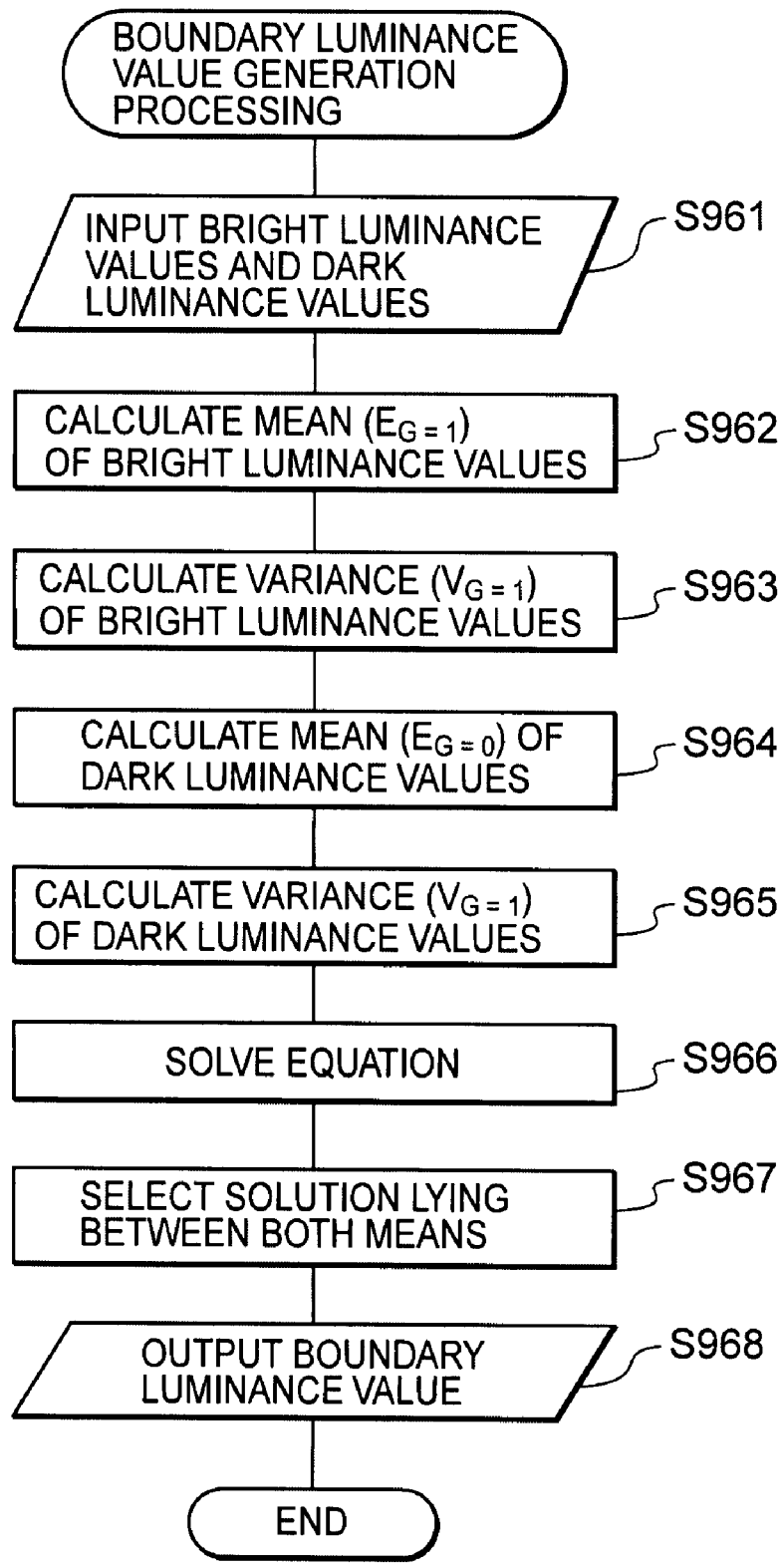
FIG. 13 is a flowchart showing one example of the processing sequence of boundary luminance value generation processing in an embodiment of the present invention.

FIG. 13 is a flowchart showing one example of the processing sequence of the boundary luminance value generation processing (step S960) in the present embodiment. When the bright-side luminance and the dark-side luminance are inputted from the bright-side luminance group memory 191 and the dark-side luminance group memory 192 (step S961), the mean of the bright-side luminance, $E_{G=1}$, is calculated (step S962), and the variance of the bright-side luminance, $V_{G=1}$, is calculated (step S963). Similarly, the mean of the dark-side luminance, $E_{G=0}$, is calculated (step S964), and the variance of the dark-side luminance, $V_{G=0}$, is calculated (step S965).

Then, the solutions of the following quadratic solution for the boundary luminance value $I_m$ are calculated (step S966).

[Equation 4]

$$\frac{-(I_m - E_{G=1})^2}{2V_{G=1}} - \frac{-(I_m - E_{G=0})^2}{2V_{G=0}} - \frac{1}{2}\log\frac{V_{G=1}}{V_{G=0}} = 0 \quad \text{[Equation 4]}$$

Equation 4 is a quadratic equation having two solutions. A solution lying in the range $E_{G=0} < I_m < E_{G=1}$ is selected from both solutions (step S967). This selected solution is outputted via the signal line 159 as a boundary luminance value (i.e., a photometry evaluation value) (step S968).

As mentioned above, according to an embodiment of the present invention, in a contrast area detected by the contrast area detection section 151, the luminance of each pixel is distributed into the bright-side luminance or the dark-side luminance and a boundary luminance value is generated as a photometry evaluation value on the basis of the distributions of the bright-side luminance and the dark-side luminance by the photometry evaluation value generation section 155. The photometry evaluation value is compared with a reference value by the difference value calculation section 180, and can in turn be used for operation control for brightness correction in the control section 190.

In the above description of the embodiment, reference has been made to an example for application to brightness correction in digital still cameras, but the present invention is not to be construed as being limited to such an example. The present invention can also be applied to, for example, brightness correction of output images in computer systems as will be mentioned below.

Figure 14:
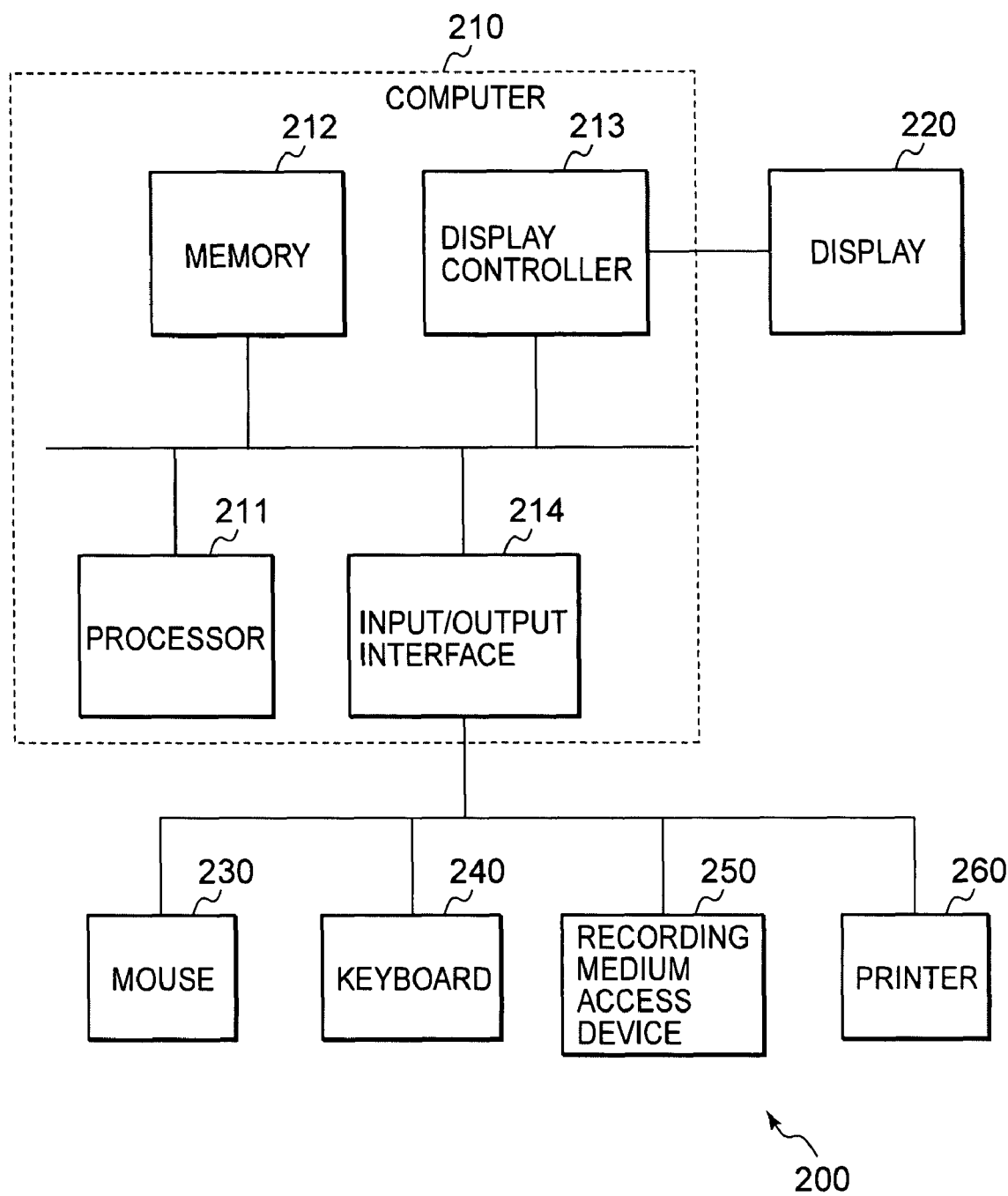
FIG. 14 is a block diagram showing one example of the construction of a computer system according to an embodiment of the present invention.

FIG. 14 is a block diagram showing one example of the construction of a computer system 200 according to an embodiment of the present invention. The computer system 200 includes a computer 210 which has a processor 211, a memory 212, a display controller 213, and an input/output interface 214.

The processor 211 is an arithmetic unit which performs execution of programs and control of individual devices. The memory 212 is a location at which to store the temporary data necessary for execution of programs and control of individual devices.

The display controller 213 is an interface for connection to displays, and has a graphics controller in built-in form. A display 220 is connected to the display controller 213. the display 220 is a display device which displays output images from the computer 210, and is realized by, for example, an LCD (Liquid Crystal Display).

The input/output interface 214 is an interface for connection to peripheral devices, and has a USB (Universal Serial Bus) controller and the like. A mouse 230, a keyboard 240, a recording medium access device 250, a printer 260 and the like are connected to the input/output interface 214. The mouse 230 receives instructions given by a user through operations such as clicking and dragging. The keyboard 240 receives instructions given by the user through character keys and numeric keys. The recording medium access device 250 is a device which performs writing and reading to and from a recording medium inserted thereinto. The printer 260 is a printing device which prints output images from the computer 210.

The computer system 200 implements a printing system which automatically reads image data recorded on the recording medium inserted in the recording medium access device 250 and prints an appropriately corrected image by means of the printer 260. The printing system may be realized by a program running on the processor 211, or may also be controlled by hardware.

Figure 15:
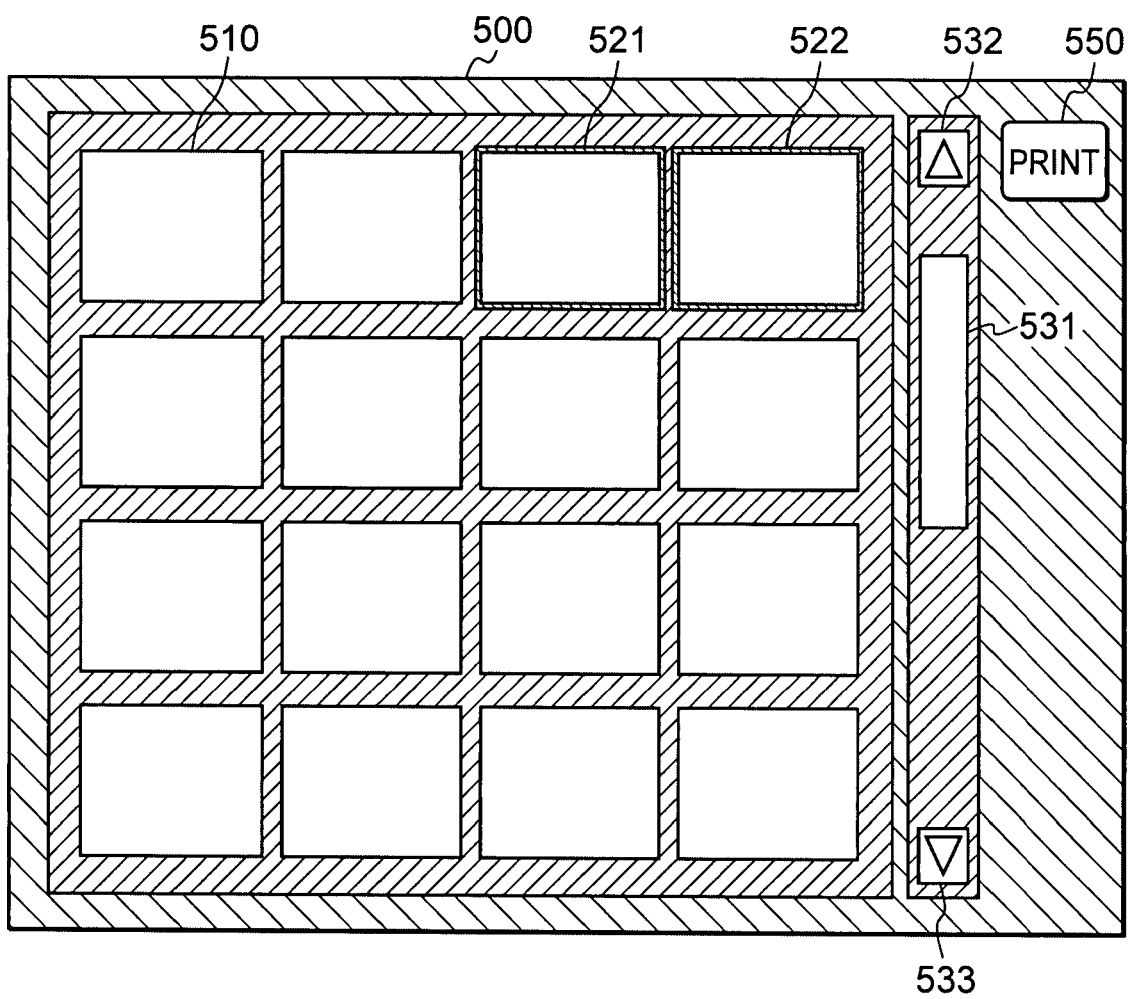
FIG. 15 is a schematic view showing a display example provided by a printing system in an embodiment of the present invention.

FIG. 15 is a schematic view showing a display example provided by the printing system in the present embodiment. An outermost frame 500 represents the area of a GUI (Graphic User Interface) display provided by the printing system, and is normally displayed on the entire screen of the display 220.

An area which occupies the greater part of the frame 500 is partitioned into 4×4 clickable small windows 510. The small windows 510 form an area in which to display thumbnails of images read from the recording medium. Since the number of images recorded on the recording medium is not necessarily 16 or less, the thumbnail display area is adapted to be able to scroll by means of a scroll bar 531 and two scroll buttons 532 and 533.

Thick frames 521 and 522 each of which is displayed at the perimeter of a respective one of the thumbnails are indicators which indicates that the respective images are in selected states. Each time any of the thumbnails is clicked, the corresponding one of the images is switched (toggled) between its selected state and its unselected state. A print button 550 located in the right corner of the screen is provided to, when clicked, start automatic correction and printing of an image which is currently in its selected state.

Figure 16:
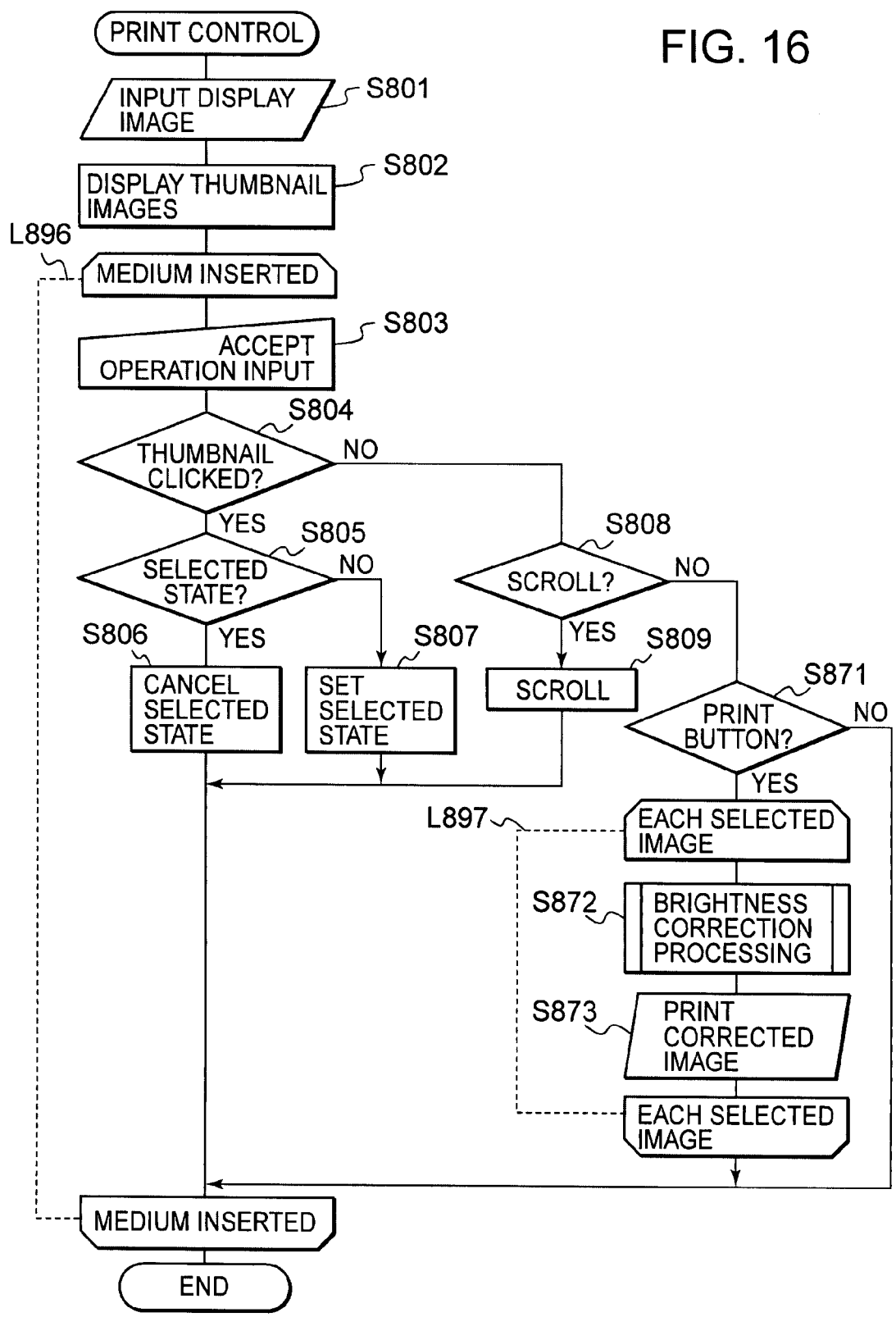
FIG. 16 is a flowchart showing one example of the processing sequence of the printing system in an embodiment of the present invention.

FIG. 16 is a flowchart showing one example of the processing sequence of the printing system in the present embodiment. When a recording medium is inserted into the recording medium access device 250, image data for display are read from the recording medium (step S801) and thumbnail images are displayed side by side on the GUI display screen (step S802). After that, while the recording medium is inserted in the recording medium access device 250, the following processing is repeated (loop L896).

When an operation input from the user is accepted (step S803), a decision is made as to the kind of the operation input. If the operation input is a click operation (step S804), the corresponding image is switched between its selected state and its unselected state according to the current state of the image (step S805). In other words, if the current state is the selected state, the selected state is cancelled (step S806), whereas if the current state is not the selected state, the selected state is set (step S807), and the operation of the printing system for this operation input is completed.

If the operation input is an operation of the scroll bar 531 or the scroll buttons 532 and 533, the printing system performs a scroll operation on the thumbnail display area, and completes the operation for this operation input.

If the operation input is a click operation of the print button 550, the printing system performs brightness correction processing on all the images that are placed in their selected states at this time (step S872), and the images subjected to the brightness correction processing are printed by the printer 260 (step S873). When the printing of all the images that are placed in the selected states is completed (step S879), the operation for this operation input is completed.

Each time the operation of the printing system for one operation input is completed, the printing system determines whether the recording medium is inserted in the recording medium access device 250, and if the recording medium is inserted, the printing system repeats the above-mentioned processing. On the other hand, if the printing system determines that the recording medium is not inserted when the operation for one operation is completed, the printing system completes the operation of the loop L896.

Figure 17:
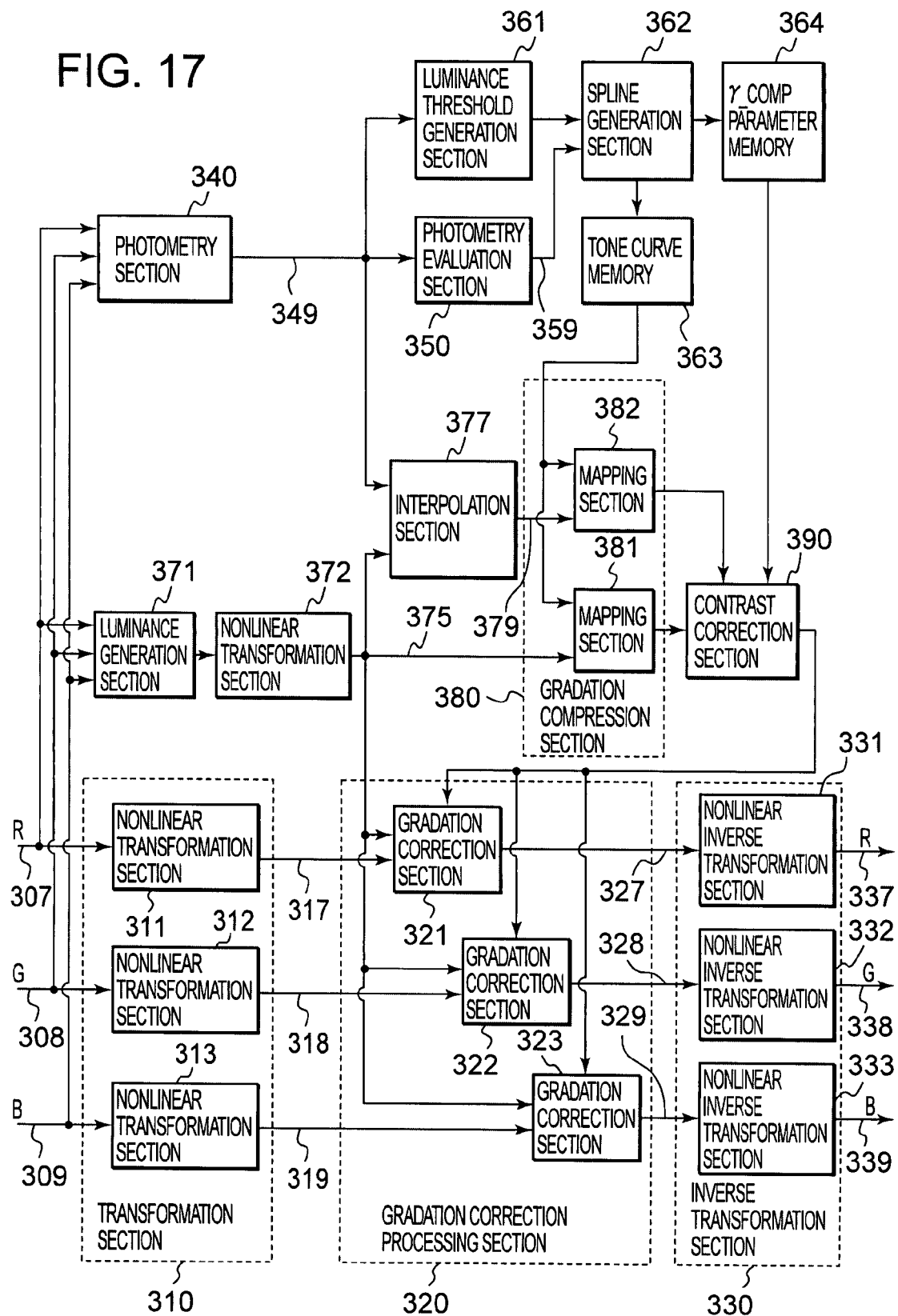
FIG. 17 is a block diagram showing an example of a functional construction for bright correction function in the computer system in an embodiment of the present invention.

FIG. 17 is a block diagram showing an example of a functional construction for bright correction function in the computer system 200 in the present embodiment. The brightness correction processing performs brightness correction on a red component R, a green component G and a blue component B of each pixel of an RGB image inputted via signal lines 307 to 309, and outputs the corrected components R, G and B to signal lines 337 to 339. The functional construction for brightness correction processing includes a transformation section 310, a gradation correction processing section 320, an inverse transformation section 330, a photometry section 340, a photometry evaluation section 350, a luminance threshold generation section 361, a spline generation section 362, a tone curve memory 363, a γ_comp parameter memory 364, a luminance generation section 371, a nonlinear transformation section 372, an interpolation section 377, a gradation compression section 380, and a contrast correction section 390.

The construction for brightness correction processing shown in FIG. 17 which will be mentioned in the following description of the present embodiment is not an indispensable constituent element of the present invention. In other words, image display with brightness correction using the present invention can be realized by using a brightness correction function which performs brightness correction such that an input luminance value corresponding to a photometry evaluation value obtained on the basis of a photometry evaluation value calculation method as mentioned in the above description of the present embodiment is converted to a moderate output luminance. As brightness correction processing other than the construction example shown in FIG. 17, it may also be considered to use a method of controlling a luminance scaling factor, a method of controlling a luminance bias value, a method of controlling the exponent of a gamma curve by using a photometry evaluation value, or a combination of these methods. Detailed description of these methods is herein omitted.

The transformation section 310 performs nonlinear transformation on the pixel value of each component of an RGB image inputted via the signal lines 307 to 309. The transformation section 310 includes nonlinear transformation sections 311 to 313, which respectively perform nonlinear transformation on the pixel values of the red component R, the green component G and the blue component B of the RGB image and output nonlinearly transformed pixel values to signal lines 317 to 319. The nonlinear transformation may use, for example, logarithmic transformation and gamma correction.

The gradation correction processing section 320 corrects (transforms) the gradations of the respective pixel values (the nonlinearly transformed pixel values of the RGB image) inputted via the signal lines 317 to 319. The gradation correction processing section 320 includes gradation correction sections 321 to 323, which respectively correct the gradations of the pixel values of the red component R, the green component G and the blue component B and output gradation-corrected pixel values to signal lines 327 to 329. A nonlinearly transformed luminance value (a signal line 375) and a contrast-corrected luminance value (a signal line 339) which are used in the gradation correction processing section 320 will be mentioned later.

The inverse transformation section 330 performs nonlinear inverse transformation on the pixel values (the gradation-corrected pixel values of the RGB image) inputted via the signal lines 317 to 319. The inverse transformation section 330 includes nonlinear inverse transformation sections 331 to 333, which respectively perform nonlinear inverse transformation on the pixel values of the red component R, the green component G and the blue component B and output nonlinearly inversely transformed pixel values to the signal lines 337 to 339.

The photometry section 340 is similar to the photometry section 140 mentioned above with reference to FIG. 2, and outputs to a signal line 349 the measured result of the brightness of the pixel values of the respective components (i.e., a block mean luminance image) of the RGB image inputted via the signal lines 307 to 309.

The photometry evaluation section 350 is similar to the photometry evaluation section 150 mentioned above with reference to FIG. 4, and generates a photometry evaluation value which evaluates the brightness of the image signal on the basis of the measured result supplied from the photometry section 340 via the signal line 349 and outputs the photometry evaluation value to a signal line 359.

The luminance threshold generation section 361 calculates a dark-side tail value $L_{dark}^{(nl)}$ and a bright-side tail value $L_{bright}^{(nl)}$ in the luminance distribution of the block mean luminance image supplied from the photometry section 340 via the signal line 349. The dark-side tail value $L_{dark}^{(nl)}$ is a boundary value at which the ratio of the number of pixels of luminance less than or equal to a predetermined boundary value to the total number of pixels of the block mean luminance image is approximately equal to a predetermined value (for example, 0.5), while the bright-side tail value $L_{bright}^{(nl)}$ is a boundary value at which the ratio of the number of pixels of luminance greater than or equal to the predetermined boundary value to the total number of pixels of the block mean luminance image is approximately equal to a predetermined value (for example, 0.5). It should be noted that, the superscript "(nl)" for each of the values indicates a nonlinearly transformed value.

Alternatively, each of the photometry evaluation section 350 and the luminance threshold generation section 361 may also be adapted to read a noise level and a saturation level for luminance values from an internal memory (not shown) and eliminate luminance values at or below the noise level and luminance values at or above the saturation level.

The spline generation section 362 handles the photometry evaluation value supplied from the photometry evaluation section 350 via the signal line 359, as an average luminance value $L_{average}^{(nl)}$, and also generates a spline curve by using the average dark-side tail value $L_{dark}^{(nl)}$ and the bright-side tail value $L_{bright}^{(nl)}$ supplied from the luminance threshold generation section 361. The spline curve represents a tone curve (a transformation curve) for gradation compression. The tone curve is calculated on the basis of the luminance distribution of an input image such that the image is reproduced with appropriate brightness. A lookup table representative of the tone curve is stored in the tone curve memory 363. A γ_comp parameter representative of the shape (inclination) of the tone curve is stored in the γ_comp parameter memory 364.

The luminance generation section 371 calculates a luminance value L corresponding to a corresponding pixel position from the pixel values of the respective components of the RGB image inputted via the signal lines 307 to 309. The nonlinear transformation section 372 performs nonlinear transformation on the luminance value L generated by the luminance generation section 371. An image formed of a luminance value $L^{(nl)}$ nonlinearly transformed by the nonlinear transformation section 372 is supplied via the signal line 375 to the interpolation section 377, the gradation compression section 380 and the gradation correction processing section 320.

The interpolation section 377 interpolates the block mean luminance image supplied from the photometry section 340, thereby enlarging the image to make the pixel value thereof the same as the pixel value of the image supplied from the nonlinear transformation section 372 via the signal line 375. The luminance value of each pixel constituting the enlarged image is supplied to the gradation compression section 380 via a signal line 379 as a global luminance value $Ll^{(nl)}$. In other words, the global luminance value $Ll^{(nl)}$ has a low frequency component of the image supplied from the nonlinear transformation section 372.

The gradation compression section 380 compresses the gradations of the luminance value $L^{(nl)}$ and the global luminance value $Ll^{(nl)}$. The gradation compression section 380 includes two mapping sections 381 and 382. The mapping section 381 compresses the gradation of the luminance value $Ll^{(nl)}$ supplied via the signal line 375 on the basis of a tone curve read from the tone curve memory 363, thereby generating a compressed luminance value $Lc^{(nl)}$. The mapping section 382 compresses the gradation of the global luminance value $Ll^{(nl)}$ supplied via the signal line 379 on the basis of a tone curve read from the tone curve memory 363, thereby generating a compressed global luminance value $Lcl^{(nl)}$. Gradation compression based on such a tone curve is called tone curve correction.

The contrast correction section 390 corrects the contrast of an image formed of the compressed global luminance value $Lcl^{(nl)}$ supplied from the mapping section 381 on the basis of the γ_comp parameters stored in the γ_comp parameter memory 364 and the compressed global luminance value $Lcl^{(nl)}$ supplied from the mapping section 382, thereby outputting a luminance value $Lu^{(nl)}$ via a signal line 399.

Specifically, the contrast correction section 390 calculates the contrast-corrected luminance value $Lu^{(nl)}$ by the following equation on the basis of the gradation-compressed luminance value $Lc^{(nl)}$ and the gradation-compressed global luminance value $Lcl^{(nl)}$ and a gain value g:

$$Lu^{(nl)} = g \cdot (Lc^{(nl)} - Lcl^{(nl)}) + Lc^{(nl)},$$

where the gain value g is a value depending on the γ_comp parameters.

An image formed of the luminance value $(Lc^{(nl)} - Lcl^{(nl)})$ is an image obtained by subtracting a global luminance image formed of very low frequency components of the image formed of the compressed luminance value $Lc^{(nl)}$ from the image formed of the compressed luminance value $Lc^{(nl)}$. Accordingly, the image formed of the luminance value $Lu^{(nl)}$ is an image whose frequency components excluding the very low frequency components of the image formed of the luminance value $Lc^{(nl)}$ are emphasized by the gain value g.

The luminance value $Lu^{(nl)}$ which is contrast-corrected by the contrast correction section 390 is supplied to the gradation correction sections 321 to 323 via the signal line 399. The gradation correction processing section 320 corrects pixel values $R^{(nl)}$, $G^{(nl)}$ and $B^{(nl)}$ supplied from the respective signal lines 317 to 319 and calculates pixel values $Ru^{(nl)}$, $Gu^{(nl)}$ and $Bu^{(nl)}$ by the following equations:

$$Ru^{(nl)} = \text{chromagain} \cdot (R^{(nl)} - L^{(nl)}) + Lu^{(nl)},$$

$$Gu^{(nl)} = \text{chromagain} \cdot (G^{(nl)} - L^{(nl)}) + Lu^{(nl)}, \text{ and}$$

$$Ru^{(nl)} = \text{chromagain} \cdot (B^{(nl)} - L^{(nl)}) + Lu^{(nl)},$$

where chromagain is a coefficient having a predetermined value for adjusting the chroma of each of the R, G and B components.

In other words, each of the pixel values $Ru^{(nl)}$, $Gu^{(nl)}$ and $Bu^{(nl)}$ is the pixel value of an image obtained by multiplying by chromagain each pixel value of a difference image representative of the difference between an image formed of the corresponding of the pixel values $R^{(nl)}$, $G^{(nl)}$ and $B^{(nl)}$ and an image formed of the luminance value $L^{(nl)}$ before gradation transformation, and then by adding an image formed of the luminance value $Lu^{(nl)}$ after contrast correction to the resultant image. Accordingly, the luminance values after gradation transformation are reflected into the nonlinearly transformed RGB values.

The pixel values $Ru^{(nl)}$, $Gu^{(nl)}$ and $Bu^{(nl)}$ generated in this manner are respectively subjected to nonlinear inverse transformation in the nonlinear inverse transformation sections 331 to 333, and pixel values Ru, Gu are Bu are respectively outputted to the signal lines 337 to 339.

In other words, the brightness correction processing described above with reference to FIG. 17 by way of example is a combination of tone curve correction processing using a tone curve calculated on the basis of the luminance of an input image and contrast correction processing which recovers the resultant degradation of contrast.

Figure 18:
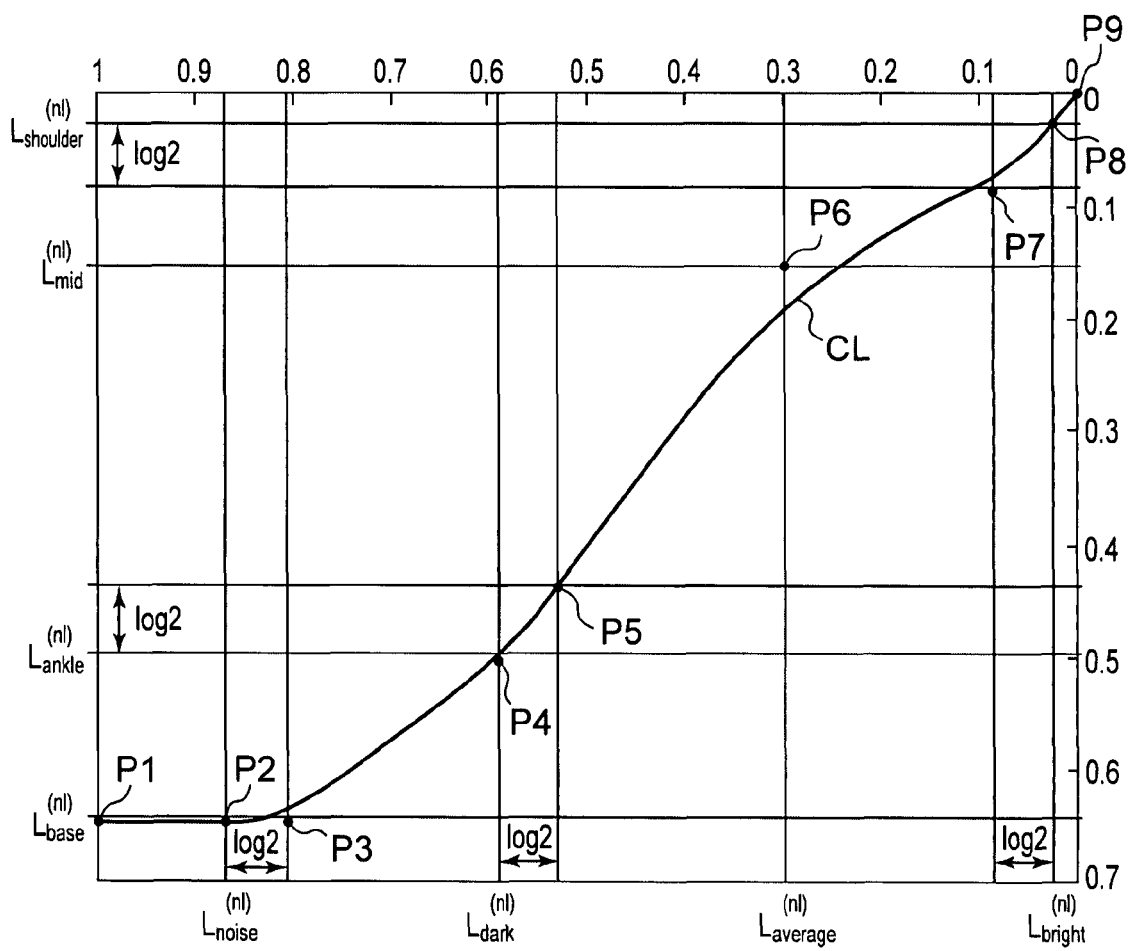
FIG. 18 is a graph showing one example of a tone curve generated by a spline generation section in an embodiment of the present invention.

FIG. 18 is a graph showing one example of the tone curve generated by the spline generation section 362 in the present embodiment. In the graph, the horizontal axis represents the nonlinearly transformed value (for example, the logarithm) of an input luminance before gradation correction, and the vertical axis represents the nonlinearly transformed value (for example, the logarithm) of an output luminance after gradation correction based on a tone curve CL.

The spline generation section 362 sets nine control points P1 to P9. Then, the spline generation section 362 calculates coordinates on a cubic spline curve which interpolates data points between each of the control points P1 to P9, and generates a lookup table for the tone curve CL.

The control point P1 is set to a point at which the input luminance assumes a predetermined minimum level, while the output luminance assumes a predetermined minimum level Lbase(nl). The control point P2 is set to a point at which the input luminance assumes a predetermined noise level Lnoise(nl) which can be regarded as a noise level, while the output luminance assumes the minimum level Lbase(nl). The control point P3 is set to a point at which the input luminance assumes a luminance value twice as large as the noise level Lnoise(nl), while the output luminance assumes the minimum level Lbase(nl).

The control point P4 is set to a point at which the input luminance assumes the dark-side tail value $L_{dark}^{(nl)}$, while the output luminance assumes a luminance value $L_{ankle}^{(nl)}$ which is a luminance value approximately equal to the black level. The control point P5 is set to a point at which the input luminance assumes a luminance value twice as large as the dark-side tail value $L_{dark}^{(nl)}$, while the output luminance assumes a luminance value twice as large as the luminance value $L_{ankle}^{(nl)}$. The control ankle point P6 is set to a point at which the input luminance assumes an average level (average luminance value) $L_{average}^{(nl)}$ of the input luminance, while the output luminance assumes a middle luminance level $L_{mid}^{(nl)}$ which is a predetermined approximate middle of the luminance range of the output luminance. The control point P is set to a point at which the input luminance assumes a luminance value one half as large as the bright-side tail value $L_{bright}^{(nl)}$, while the output luminance assumes a luminance value $L_{shoulder}^{(nl)}$ which is a luminance value approximately equal to the while level. The control point P8 is set to a point at which the input luminance assumes the bright-side tail value $L_{bright}^{(nl)}$, while the output luminance assumes the luminance value $L_{shoulder}^{(nl)}$. The control point P9 is set to a point at which the input luminance assumes a predetermined maximum value, while the output luminance assumes a predetermined maximum value.

In other words, the respective control points P1, P2, P3 and P9 are previously given fixed values according to the noise levels, the saturation levels, the gradation characteristics and the like of the input image and an assumed output device, and do not vary with the luminance distributions of individual input images. The control points P4, P6 and P8 are similarly fixed with respect to their vertical axis coordinates, while their horizontal axis coordinates are calculated according to the luminance distributions of individual input images. The locations of the control points P5 and P7 are dependently determined when the locations of the control points P4, P6 and P8 are determined according to the input image. The inclination of a line segment which joins the control points P5 and P7 is a γ_comp parameter stored in the γ_comp parameter memory 364.

The control point P6 is the most important control point that determines the brightness of an image to be reproduced, because the control point P6 is mapped into the moderate brightness of the output image. Accordingly, in the present embodiment, the photometry evaluation value generated by the photometry evaluation section 350 is used as the horizontal axis coordinate (the average luminance value) of the control point P6 such that the image is reproduced with more appropriate brightness.

Figure 19:
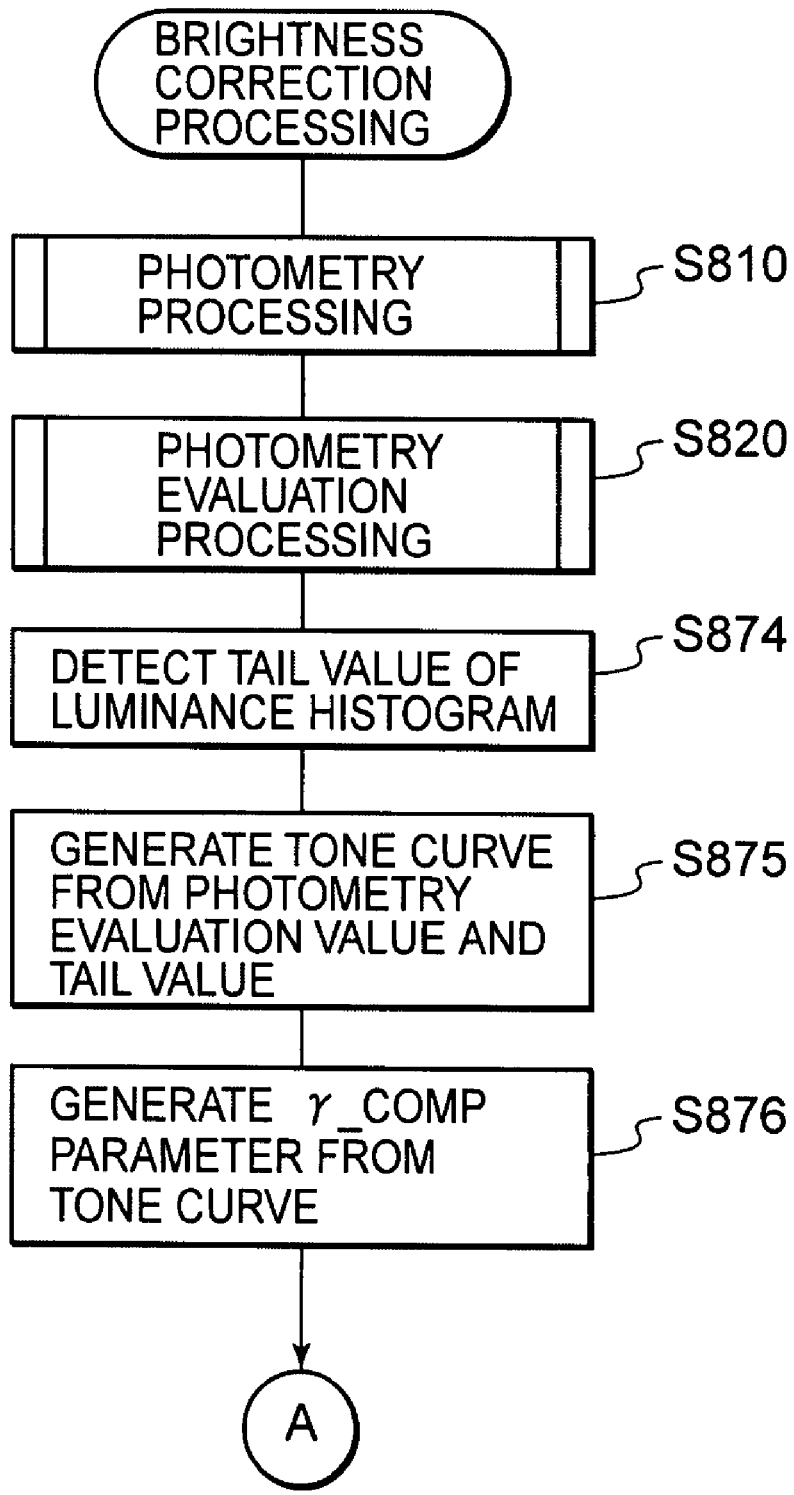
FIG. 19 is a flowchart showing one example of the first half of the brightness correction sequence of the printing system in an embodiment of the present invention.
Figure 20:
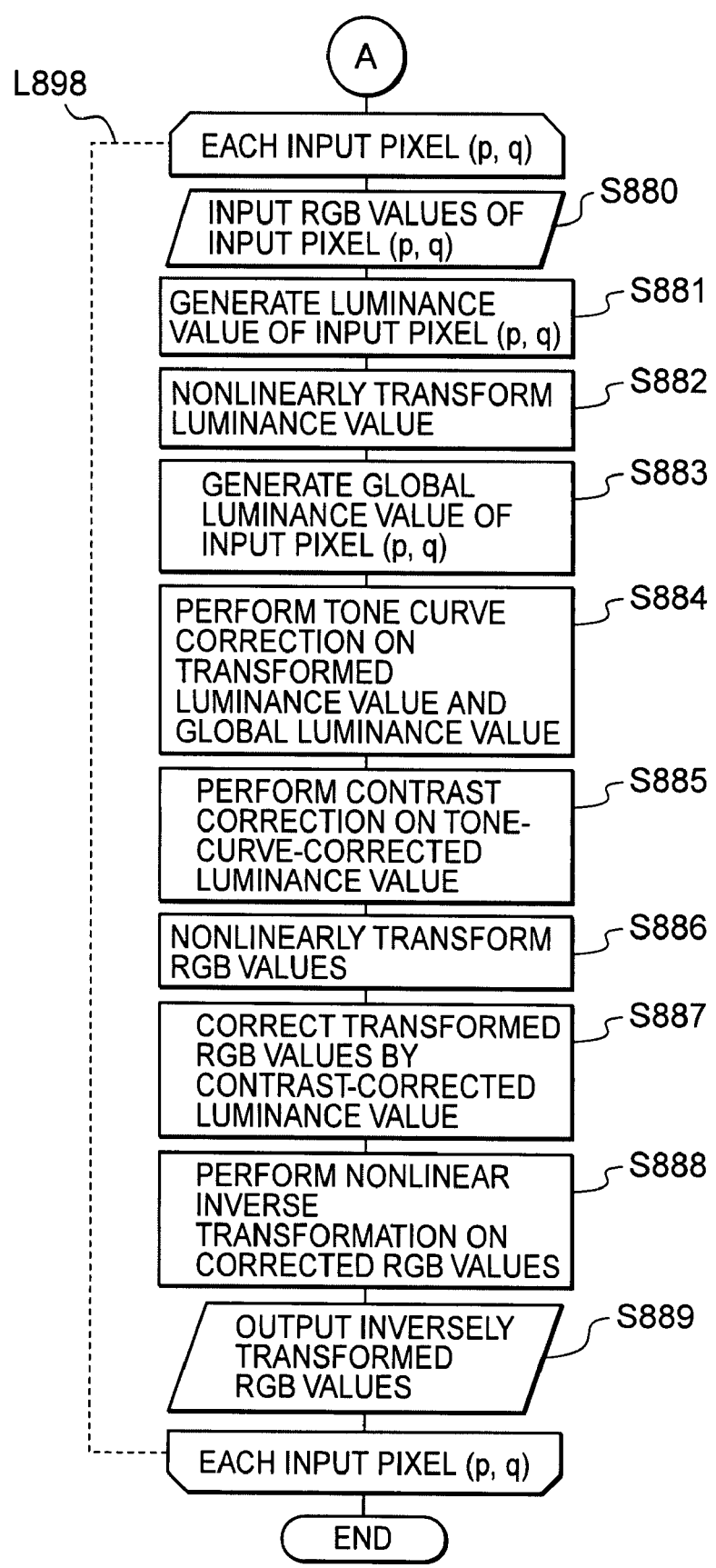
FIG. 20 is a flowchart showing one example of the second half of the brightness correction sequence of the printing system in an embodiment of the present invention.

FIGS. 19 and 20 are flowcharts showing one example of the brightness correction sequence of the printing system in the present embodiment. The brightness correction processing is two-pass processing which scans all images of an input image twice. As shown in FIG. 19, the first pass performs generation of a block mean image using photometry evaluation and calculation of a tone curve. As shown in FIG. 20, the second pass performs gradation correction processing on all pixels on the basis of the block mean image and the tone curve.

In the brightness correction processing, first, the photometry section 340 performs measurement of the brightness of a subject image as photometry processing and generates a block mean luminance image (step S810). The sequence of the photometry processing is similar to that of the photometry processing (step S910) mentioned previously with reference to FIG. 8.

On the basis of the generated block mean luminance image, the photometry evaluation section 350 generates a photometry evaluation value through photometry evaluation processing (step S820). The sequence of the photometry evaluation processing is similar to that of the photometry evaluation processing (step S920) mentioned previously with reference to FIG. 9.

Then, the luminance threshold generation section 361 generates bright-side and dark-side tail values of a luminance histogram from the luminance distribution of the block mean luminance image (step S874).

The spline generation section 362 generates a tone curve which uses as the average luminance value $L_{average}^{(nl)}$ the photometry evaluation value supplied from the photometry evaluation section 350 and as the bright-side and dark-side tail values $L_{bright}^{(nl)}$ and $L_{dark}^{(nl)}$ (step S875) the respective bright-side and dark-side tail values supplied from the luminance threshold generation section 361. A lookup table representing the generated tone curve is stored in the tone curve memory 363. In addition, the inclination of a line segment which joins the control points P5 and P7 of the tone curve is generated as a γ_comp parameter (step S876). The γ_comp parameter is stored in the γ_comp parameter memory 364.

Then, the following processing is performed on each pixel of the input subject image (loop L898). In the following description, each pixel of the subject image is represented by two-dimensional coordinates (p, q), where p and q are integers greater than or equal to 0.

First, when the RGB values of the pixel (p, q) of the input pixel (p, q) are inputted (step S880), the luminance value L of the pixel (p, q) is generated by the luminance generation section 371 (step S881). The nonlinear transformation section 372 nonlinearly transforms the luminance value L and outputs the luminance value $L^{(nl)}$ (step S882).

Then, the interpolation section 377 performs interpolation processing on the block mean luminance image generated through the first pass, on the basis of the nonlinearly transformed luminance value $L^{(nl)}$, thereby generating the global luminance value $Ll^{(nl)}$ corresponding to the pixel (p, q) (step S883).

The luminance value $L^{(nl)}$ and the global luminance value $Ll^{(nl)}$ of the pixel (p, q) which have been generated in this manner are respectively subjected to tone curve correction (gradation compression) based on the tone curve by the mapping sections 381 and 382 (step S884). Thus, the compressed luminance value Lc$^{(nl)}$ and the compressed global luminance value Lcl$^{(nl)}$ are generated. The contrast correction section 390 performs contrast correction on the compressed luminance value Lc$^{(nl)}$ on the basis of the compressed global luminance value Lcl$^{(nl)}$ and the γ_comp parameter (step S885). The luminance value Lu$^{(nl)}$ after contrast correction is used for gradation correction processing.

In addition, the RGB values of the pixel (p, q) of the subject image are nonlinearly transformed by the nonlinear transformation sections 311 to 313 (step S886). The nonlinearly transformed RGB values R$^{(nl)}$, G$^{(nl)}$ and B$^{(nl)}$ are respectively subjected to gradation correction by the gradation correction sections 321 to 323 on the basis of the nonlinearly transformed luminance value L$^{(nl)}$ and the luminance value Lu$^{(nl)}$ after contrast correction. The gradation-corrected RGB values Ru$^{(nl)}$, Gu$^{(nl)}$ and Bu$^{(nl)}$ are subjected to nonlinear inverse transformation by the nonlinear inverse transformation sections 331 to 333 (step S888). Thus, the nonlinearly inversely transformed RGB values Ru, Gu and Bu are outputted (step S889).

When the above-mentioned processing is performed on all pixels, the brightness correction processing on the subject image is completed.

As is apparent from the above description, the present invention can be applied not only to brightness correction in image capture apparatuses such as digital still cameras, but also to a wide range of applications such as brightness correction for printing in computer systems.

The above-mentioned embodiment of the present invention is merely one example in which the present invention is embodied, and the constituent elements of the embodiment have correspondences to the elements set forth in the appended claims as will be mentioned later, but the present invention is not to be construed as being limited to the above-mentioned embodiment and can be modified in various ways without departing from the scope of the present invention.

The contrast area detection means in one aspect of the present invention corresponds to, for example, the contrast area detection section 151. The luminance distribution means in this aspect of the present invention corresponds to, for example, the luminance distribution section 156. The boundary luminance value generation means in this aspect of the present invention corresponds to, for example, the boundary luminance value generation section 157.

The local contrast calculation means in another aspect of the present invention corresponds to, for example, the local contrast calculation section 152. The threshold decision means in this aspect of the present invention corresponds to, for example, the threshold decision section 153.

The nonlinear transformation means in still another aspect of the present invention corresponds to, for example, the nonlinear transformation section 142. The contrast area detection means in this aspect of the present invention corresponds to, for example, the contrast area detection section 151. The luminance distribution means in this aspect of the present invention corresponds to, for example, the boundary luminance value generation section 157.

The image capture means in another aspect of the present invention corresponds to, for example, the sensor 113. The contrast area detection means in this aspect of the present invention corresponds to, for example, the contrast area detection section 151. The luminance distribution means in this aspect of the present invention corresponds to, for example, the luminance distribution section 156. The boundary luminance value generation means in this aspect of the present invention corresponds to, for example, the boundary luminance value generation section 157. The control means in this aspect of the present invention corresponds to, for example, the difference value calculation section 180 and the control section 190.

The contrast area detection means in another aspect of the present invention corresponds to, for example, the contrast area detection section 151. The luminance distribution means in this aspect of the present invention corresponds to, for example, the luminance distribution section 156. The boundary luminance value generation means in this aspect of the present invention corresponds to, for example, the boundary luminance value generation section 157. The control means in this aspect of the present invention may include, for example, the spline generation section 362, the interpolation section 377 and the contrast correction section 390.

The transformation curve calculation means in another aspect of the present invention corresponds to, for example, the spline generation section 362. The global luminance calculation means in this aspect of the present invention corresponds to, for example, the interpolation section 377. The gradation compression means in this aspect of the present invention corresponds to, for example, the gradation compression section 380. The contrast correction means in this aspect of the present invention corresponds to, for example, the contrast correction section 390.

The contrast area detection step in another aspect of the present invention corresponds to, for example, the step S930. The luminance distribution step in this aspect of the present invention corresponds to, for example, the step S950. The boundary luminance value generation step in this aspect of the present invention corresponds to, for example, the step S960.

The image capture step in another aspect of the present invention corresponds to, for example, the step S901. The contrast area detection step in this aspect of the present invention corresponds to, for example, the step S930. The luminance distribution step in this aspect of the present invention corresponds to, for example, the step S950. The boundary luminance value generation step in this aspect of the present invention corresponds to, for example, the step S960. The control step in this aspect of the present invention corresponds to, for example, the step S904.

The contrast area detection step in another aspect of the present invention corresponds to, for example, the step S930. The luminance distribution step in this aspect of the present invention corresponds to, for example, the step S950. The boundary luminance value generation step in this aspect of the present invention corresponds to, for example, the step S960. The brightness correction step in this aspect of the present invention may include, for example, the step S875 and S883 to S885.

The transformation curve calculation step in another aspect of the present invention corresponds to, for example, the step S875. The global luminance calculation step in this aspect of the present invention corresponds to, for example, the step S883. The gradation compression step in this aspect of the present invention corresponds to, for example, the step S884. The contrast correction step in this aspect of the present invention corresponds to, for example, the step S885.

The processing sequences mentioned in the above description of the present embodiment may be understood as a method including the processing sequences, and may also be understood as a program for causing a computer to execute the processing sequences as well as a recording medium which stores the program.

The present application contains subject matters related to Japanese Patent Application No. 2006-162927 filed in Japanese Patent Office on Jun. 12, 2006, the entire content of which being incorporated herein by reference.

It should be understood by those skilled in the art that various modifications, combinations, sub-combinations, and alterations may occur depending on design requirements and other factors insofar as they are within the scope of appended claims and equivalents thereof.

What is claimed is:

1. An image processing apparatus comprising:
   contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value, wherein the contrast area detection means includes:
       local contrast calculation means for calculating the contrast of the input luminance of each of the partial areas as a local contrast, and
       threshold decision means for determining whether the local contrast of the input luminance of each of the partial areas is greater than a predetermined threshold, the threshold decision means determining that if the local contrast is greater than the predetermined threshold, the partial area corresponds to the contrast area;
   luminance distribution means for distributing the input luminance in the contrast area into a bright-side luminance corresponding to a bright side of the input luminance and a dark-side luminance corresponding to a dark side of the input luminance; and
   boundary luminance value generation means for generating a boundary luminance value between the bright-side luminance and the dark-side luminance on the basis of the distributions of the bright-side luminance and the dark-side luminance,
   wherein the contrast calculation means calculates as the local contrast an absolute value of a local first order derivative of the input luminance of each of the partial areas.

2. An image processing apparatus comprising:
   contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value, wherein the contrast area detection means includes:
       local contrast calculation means for calculating the contrast of the input luminance of each of the partial areas as a local contrast, and
       threshold decision means for determining whether the local contrast of the input luminance of each of the partial areas is greater than a predetermined threshold, the threshold decision means determining that if the local contrast is greater than the predetermined threshold, the partial area corresponds to the contrast area;
   luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance,
   wherein the contrast calculation means calculates as the local contrast an absolute value of a local second order derivative of the input luminance of each of the partial areas.

3. An image processing apparatus comprising:
   contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value, wherein the contrast area detection means includes:
       local contrast calculation means for calculating the contrast of the input luminance of each of the partial areas as a local contrast, and
       threshold decision means for determining whether the local contrast of the input luminance of each of the partial areas is greater than a predetermined threshold, the threshold decision means determining that if the local contrast is greater than the predetermined threshold, the partial area corresponds to the contrast area;
   luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance,
   wherein the contrast calculation means calculates as the local contrast an absolute value of a difference between a maximum value and a minimum value of the input luminance of each of the partial areas.

4. An image processing apparatus comprising:
   contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value;
   luminance distribution means for distributing the input luminance in the contrast area into a bright-side luminance corresponding to a bright side of the input luminance and a dark-side luminance corresponding to a dark side of the input luminance; and
   boundary luminance value generation means for generating a boundary luminance value between the bright-side luminance and the dark-side luminance on the basis of the distributions of the bright-side luminance and the dark-side luminance,
   wherein the luminance distribution means distributes a maximum value of the input luminance into the bright-side luminance and a minimum value of the input luminance into the dark-side luminance for each of local areas corresponding to the contrast area.

5. An image processing apparatus comprising:
   contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value;

luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance, wherein the luminance distribution means distributes the input luminance of each of pixel positions corresponding to the contrast area into either of the bright-side luminance or the dark-side luminance according to the positive and negative of a local second order derivative of the input luminance of each of the pixel positions.

6. An image processing apparatus comprising:

contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value;

luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance, wherein the boundary luminance value generation means generates a boundary luminance value $I_m$ ($E_{G=0} < I_m < E_{G=1}$) which is a solution of an equation:

$$\frac{-(I_m - E_{G=1})^2}{2V_{G=1}} - \frac{-(I_m - E_{G=0})^2}{2V_{G=0}} - \frac{1}{2}\log\frac{V_{G=1}}{V_{G=0}} = 0$$

as the boundary luminance value on the basis of a mean $E_{G=1}$ of the bright-side luminance, a variance $V_{G=1}$ of the bright-side luminance, a mean $E_{G=0}$ of the dark-side luminance, and a variance $V_{G=0}$ of the dark-side luminance.

7. An image processing apparatus comprising:

contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value;

luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance, wherein the boundary luminance value generation means generates a boundary luminance value $I_m$ ($E_{G=0} < I_m < E_{G=1}$) which is a solution of an equation:

$$\frac{(I_m - E_{G=1})^2}{V_{G=1}} = \frac{(I_m - E_{G=0})^2}{V_{G=0}}$$

as the boundary luminance value on the basis of a mean $E_{G=1}$ of the bright-side luminance, a variance $V_{G=1}$ of the bright-side luminance, a mean $E_{G=0}$ of the dark-side luminance, and a variance $V_{G=0}$ of the dark-side luminance.

8. An image processing apparatus comprising:

nonlinear transformation means for performing nonlinear transformation on the luminance of each pixel of an input image signal formed by a plurality of pixels;

contrast area detection means for detecting a partial area from among partial areas in the input image signal as a contrast area, the contrast area being a partial area in which contrast of an input luminance, which is a luminance subjected to the nonlinear transformation, is greater than a predetermined value;

luminance distribution means for distributing the input luminance in the contrast area into a bright-side luminance corresponding to a bright side of the input luminance and a dark-side luminance corresponding to a dark side of the input luminance; and boundary luminance value generation means for generating a boundary luminance value between the bright-side luminance and the dark-side luminance on the basis of the distributions of the bright-side luminance and the dark-side luminance, wherein the nonlinear transformation means performs the nonlinear transformation in accordance with a positive monotonic increasing function.

9. An image processing apparatus according to claim 8, wherein the nonlinear transformation means performs logarithmic transformation as the nonlinear transformation.

10. An image processing apparatus according to claim 8, wherein the nonlinear transformation means performs gamma correction as the nonlinear transformation.

11. An image output apparatus comprising:

contrast area detection means for detecting a partial area from among partial areas in an input image signal as a contrast area, the input image signal being formed by a plurality of pixels, the contrast area being a partial area in which contrast of an input luminance indicative of a luminance of the input image signal is greater than a predetermined value;

luminance distribution means for distributing the input luminance in the contrast area into a bright-side luminance corresponding to a bright side of the input luminance and a dark-side luminance corresponding to a dark side of the input luminance;

boundary luminance value generation means for generating a boundary luminance value between the bright-side luminance and the dark-side luminance on the basis of the distributions of the bright-side luminance and the dark-side luminance; and brightness correction means for performing brightness correction such that a luminance value of the input luminance which corresponds to the boundary luminance value is outputted as a moderate luminance value, wherein the brightness correction means includes:

transformation curve calculation means for calculating a transformation curve to be used for compression of luminance gradation, on the basis of the boundary luminance value and the distribution of the input luminancen, global luminance calculation means for calculating a global luminance indicative of the luminance of a global luminance image formed by low frequency components of the input image, gradation compression means for compressing the gradation of the input luminance and the gradation of the global luminance on the basis of the transformation curve, and contrast correction means for correcting the contrast of a gradation-compressed input image formed by the input luminance whose gradation is compressed on the basis of an inclination of the transformation curve and the gradation-compressed global luminance.

12. An image output method comprising:

detecting a partial area from among partial areas in an input image signal as a contrast area, the input image signal being formed by a plurality of pixels, the contrast area being a partial area in which contrast of an input luminance indicative of a luminance of the input image signal is greater than a predetermined value;

distributing the input luminance in the contrast area into a bright-side luminance corresponding to a bright side of the input luminance and a dark-side luminance corresponding to a dark side of the input luminance;

generating a boundary luminance value between the bright-side luminance and the dark-side luminance on the basis of the distributions of the bright-side luminance and the dark-side luminance; and performing brightness correction such that a luminance value of the input luminance which corresponds to the boundary luminance value is outputted as a moderate luminance value, wherein the performing brightness correction includes:

calculating a transformation curve to be used for compression of luminance gradation, on the basis of the boundary luminance value and the distribution of the input luminance, calculating a global luminance indicative of the luminance of a global luminance image formed by low frequency components of the input image, compressing the gradation of the input luminance and the gradation of the global luminance on the basis of the transformation curve, and correcting the contrast of a gradation-compressed input image formed by the input luminance whose gradation is compressed on the basis of an inclination of the transformation curve and the gradation-compressed global luminance.

* * * * *